(12) United States Patent
Scheier et al.

(10) Patent No.: US 7,761,306 B2
(45) Date of Patent: Jul. 20, 2010

(54) ICFOUNDATION WEB SITE DEVELOPMENT SOFTWARE AND ICFOUNDATION BIZTALK SERVER 2000 INTEGRATION

(76) Inventors: Paul Scheier, 4876 DTC Blvd., #5-204, Denver, CO (US) 80237; Darrell Schaefers, 2847 S. Fundy St., Aurora, CO (US) 80013; Tony Schaefers, 5069 Bur Oak La., Parker, CO (US) 80134

( * ) Notice: Subject to any disclaimer, the term of this patent is extended or adjusted under 35 U.S.C. 154(b) by 734 days.

(21) Appl. No.: 11/335,963

(22) Filed: Jan. 20, 2006

(65) Prior Publication Data

US 2006/0143040 A1 Jun. 29, 2006

Related U.S. Application Data

(63) Continuation of application No. 09/842,684, filed on Apr. 27, 2001, now abandoned.

(60) Provisional application No. 60/262,076, filed on Jan. 18, 2001, provisional application No. 60/202,518, filed on May 9, 2000.

(51) Int. Cl.
*G06Q 99/00* (2006.01)
(52) U.S. Cl. ..................................................... 705/1.1
(58) Field of Classification Search .................. 705/1, 705/1.1
See application file for complete search history.

(56) References Cited

U.S. PATENT DOCUMENTS

| 6,026,433 | A | 2/2000 | D'Arlach et al. |
| 6,144,988 | A | 11/2000 | Kappel |
| 6,263,352 | B1 | 7/2001 | Cohen |
| 6,505,212 | B2 | 1/2003 | Nakano et al. |
| 6,546,397 | B1 | 4/2003 | Rempell |
| 6,697,825 | B1 | 2/2004 | Underwood et al. |
| 6,701,343 | B1 | 3/2004 | Kenyon |
| 6,745,238 | B1 | 6/2004 | Giljum et al. |
| 6,748,425 | B1* | 6/2004 | Duffy et al. ................. 709/217 |
| 2002/0089539 | A1* | 7/2002 | Lindhorst et al. ........... 345/764 |
| 2003/0120659 | A1 | 6/2003 | Sridhar |
| 2003/0167213 | A1 | 9/2003 | Jammes et al. |
| 2003/0217117 | A1 | 11/2003 | Dan et al. |

FOREIGN PATENT DOCUMENTS

WO    WO 00/57314 A2    9/2000

* cited by examiner

*Primary Examiner*—Jonathan Ouellette
(74) *Attorney, Agent, or Firm*—Greenberg Traurig, LLP

(57) ABSTRACT

A system and method for use in managing a system site for e-commerce. The system accepts user input via a wizard to create objects which function to at least retrieve data from a database and accepts user input via a wizard to create scripts which function to at least convert data retrieved by the objects to an HTML stream for real-time transmission to a browser resident on a client computer whereby actual HTML text files need not be created and stored on a Web server.

2 Claims, 20 Drawing Sheets

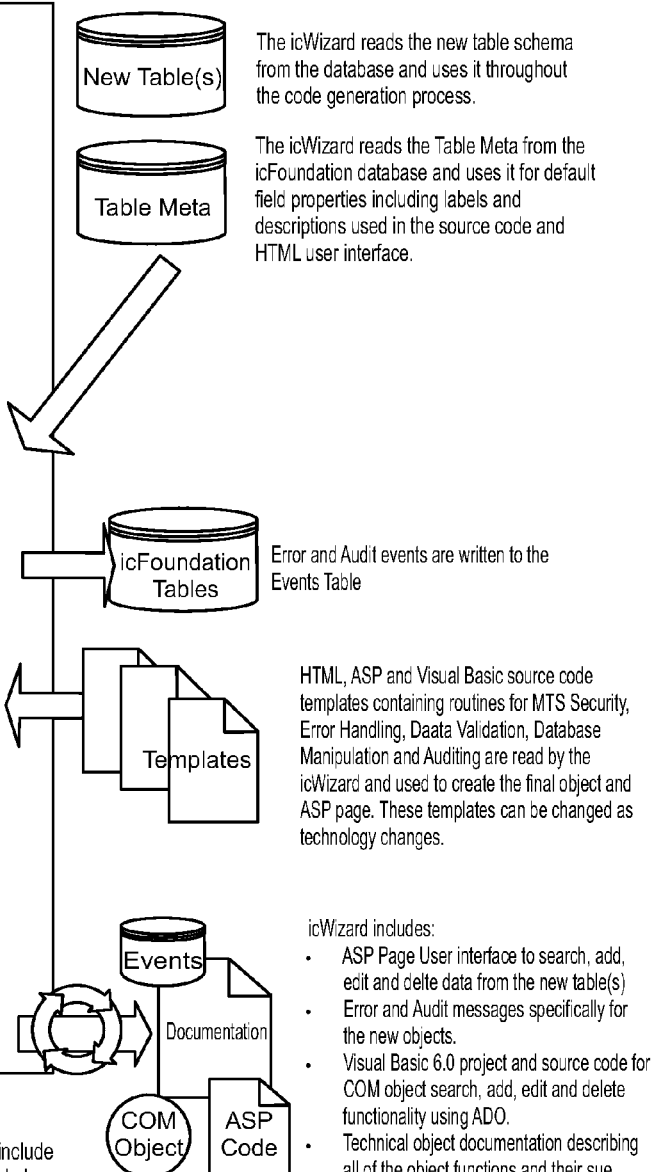
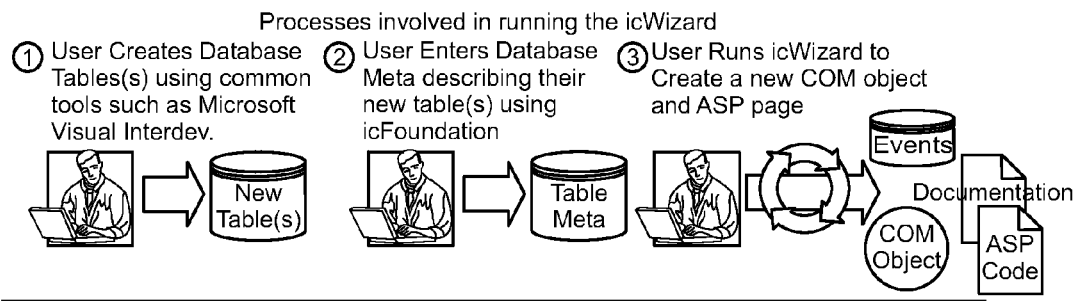
FIG. 7

| Business Applications |
| --- |
| Common Business Objects |

| Sites | Groups & Users | icWizard | Digitally Sign | icFoundation<br>Rapid Internet Development Framework | | | | | |
| --- | --- | --- | --- | --- | --- | --- | --- | --- | --- |
| | | | | Messaging Services | Security | Audit | Reporting | Multiple Devices | Content |
| | | | | BizTalk Server 2000 | | | | | |
| | | | | BizTalk Orchestration | | | | | |
| Data Transforms | Encode/ Decode | | Encrypt/ Decrypt | BizTalk Messaging | | | | | |
| | | | | Transport/ Receive | Reliability/ Extensibility | | LOB Adapters | Sync/ Async | XML |

| Intranet/Extranet/Internet/VAN |
| --- |

FIG. 8

| BizTalkSchema_ID | Int (Primary Key) | Auto-generated key field |
|---|---|---|
| SchemaName | Varchar(30) | User-friendly name for the message |
| ReqRootTag | Varchar(30) | Root XML Tag name |
| AckRootTag | Varchar(30) | Root tag for the Ack message |
| SubMenu_ID | Int | Key of the Sub Menu Item used to secure this request. |
| DescriptionFile | Varchar(255) | Name of an HTML file describing the message exchange. |

FIG. 14

| Argument | Type | In/Out | Description |
|---|---|---|---|
| strXML | String | In | XML containing authentication elements. |
| StrLanguage | String | Out | Name of Language to return messages in (i.e. English). If blank then English is assumed. |
| StrSiteUrl | String | Out | URL of the site this user is trying to logon to (i.e. intranet.planetci.com). |
| strUserName | String | Out | User Name of the logon. Must match Login.UserName field in the database to authenticate. |
| StrPassword | String | Out | Password of the logon in clear text. The AuthenticateLogin object will create an SHA-1 has of this text and compare it to the Login.Password field in the database to authenticate. |
| StrResult | String | Out | If failure or error, this will contain the user-friendly text to display to the end user with the failure or error description. |
| StrErrorMsg | String | Out | If failure or error, this will contain additional error information. If the strOptions /EEXML or /ERXML flags are on, this will be in XML. |
| StrRootTag | String | Out | Root XML Tag extracted from the document. |

FIG. 16

| Argument | Type | In/Out | Description |
|---|---|---|---|
| strLanguage | String | In | Name of Language to return messages in (i.e. English). If blank then English is assumed. |
| strSiteUrl | String | In | ULR of the site this user is trying to logon to (i.e. intranet.planetci.com). |
| strUserName | String | In | User Name of the logon. Must match Login.UserName field in the database to authenticate. |
| strPassword | String | In | Password of the logon in clear text. The AuthenticateLogin object will create an SHA-1 hash of this text and compare it to the Login.Password field in the database to authenticate. |
| lngLogin_ID | Int | Out | If the authentication is successful, this will contain the Primary key to the login table for the user. |
| lngProject_ID | Int | Out | If the authentication is successful, this will contain the Primary key to the project table for the strSiteUrl. |
| LngLanguage_ID | Int | Out | If the authentication is successful, this will contain the Primary key to the Language table for the strLanguage. |
| strFullName | String | Out | First and Last name of the user. |
| strEmail | String | Out | Email address of the user. |
| strResult | String | Out | If failure or error, this will contain the user-friendly text to display to the end user with the failure or error description. |
| strErrorMsg | String | Out | If failure or error, this will contain additional error information. If the strOptions /EEXML or /ERXML flags are on, this will be in XML. |

FIG. 17

| Argument | Type | In/Out | Description |
|---|---|---|---|
| lngLanguage_ID | Int | In | Name of Language to return messages in (i.e. English). If blank then English is assumed. |
| lngProject_ID | Int | In | Foreign key for the URL of the site this user is trying to logon to (i.e. intranet.planetci.com). |
| lngLogin_ID | Int | In | If the authentication is successful, this will contain the Primary key to the login table for the user. |
| strRootTag | String | In | Root tag that must match FNBizTalkSchema.RootTag field. |
| strResult | String | Out | If failure or error, this will contain the user-friendly text to display to the end user with the failure or error description. |
| strErrorMsg | String | Out | If failure or error, this will contain additional error information. If the strOptions /EEXML or /ERXML flags are on, this will be in XML. |

FIG. 18

| Argument | Type | In/Out | Description |
|---|---|---|---|
| lngLanguage_ID | Int | In | Name of Language to return messages in (i.e. English). If blank then English is assumed. |
| lngProject_ID | Int | In | Foreign key for the URL of the site this user is trying to logon to (i.e. intranet.planetci.com). |
| lngLogin_ID | Int | In | If the authentication is successful, this will contain the Primary key to the login table for the user. |
| NdReport | XML DOM | In | XML DOM Object containing the report request. |
| strResult | String | Out | If failure or error, this will contain the user-friendly text to display to the end user with the failure or error description. |
| strErrorMsg | String | Out | If failure or error, this will contain additional error information. If the strOptions /EEXML or /ERXML flags are on, this will be in XML. |

FIG. 19

ICFOUNDATION WEB SITE DEVELOPMENT SOFTWARE AND ICFOUNDATION BIZTALK SERVER 2000 INTEGRATION

CROSS-REFERENCE TO RELATED APPLICATIONS

The present application is a continuation of and claims priority to U.S. application Ser. No. 09/842,684 filed on Apr. 27, 2001 which, in turn, claims the benefit of Provisional U.S. Patent Application No. 60/262,076 filed on Jan. 18, 2001 and Provisional U.S. patent application Ser. No. 60/202,518 filed on May 9, 2000, all of which are incorporated herein by reference.

FIELD OF THE INVENTION

The present invention relates to the field of computer software. In particular, the present invention relates to the filed of development and management tools for developing and managing internet websites and providing security therefor.

BACKGROUND OF THE INVENTION

Programs are known in the art for generating websites. Such program "wizards" may be used to create an HTML (XTML, XML, or the like) document which may be used as a web page. Unfortunately, such prior art wizards may be useful only for initial generation of a website. If the website is to be altered or maintained, the resultant HTML document must either be edited ("hard coded") in HTML (or the like) or a new website developed using the wizard. A need exists in the art, therefor, for a program which may maintain a website once it has been generated.

In addition, hacking on the Internet has become an increasing problem. An organization may find itself vulnerable to attack by hackers if such hackers may access a web page directly, without going through intermediary web pages (which may generate password authentication routines). Thus, a further need exists in the art for a security system which allows a web site designer or operator to prevent unauthorized outside users from directly accessing web pages.

SUMMARY OF THE INVENTION icFoundation is the core of a Web-based Electronic Commerce system. The icFoundation product provides a platform between corporate systems and e-commerce channels with common presentation and navigation, environment management, common standards, error management, auditing, and enhanced security features. icFoundation combines three basic standards of Transaction Processing; Scalability, Reliability, and Security. icFoundation specifically takes full advantage of the Pentium class Processor running Windows NT. A single server may easily scale from 8 to 32 processors and multiple servers may be combined into a centralized or distributed architecture. icFoundation may be tightly integrated with Microsoft® Transaction Server (MTS). Integrating MTS into icFoundation provides the assurance that the integrity of data is maintained as it moves across the system. icFoundation uses Secure Sockets Layer technology in order to encrypt and protect data.

BRIEF DESCRIPTION OF THE DRAWINGS

FIG. 7 is a flowchart illustrating icWizard Overview.

FIG. 8 is a diagram depicting a framework for Internet based applications using BizTalk Server 2000 and icFoundation.

FIG. 14 is a BizTalkSchema table which may be added to the icFoundation database which may contain all of the interface information necessary for handling XML requests.

FIG. 16 is a table illustrating the function arguments for the authorization translator.

FIG. 17 is a table illustrating the function arguments for user authentication.

FIG. 18 is a table illustrating the function arguments for checking navigation permissions.

FIG. 19 is a table illustrating the function arguments for checking report permission.

DETAILED DESCRIPTION OF THE INVENTION

Figure 1:
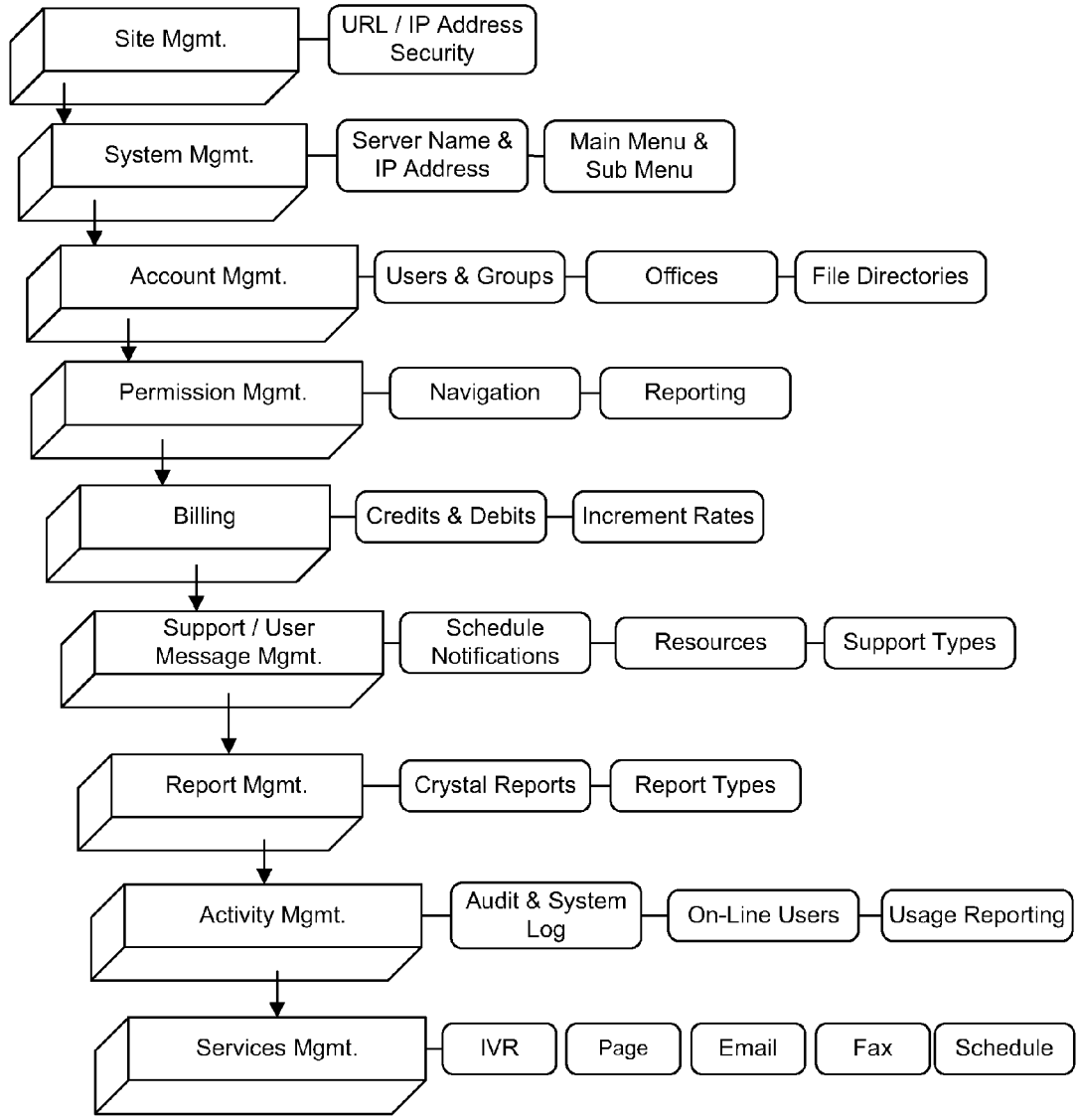
FIG. 1 is a flowchart illustrating icFOUNDATION Functionality and application hierarchy.

FIG. 1 is a flowchart illustrating icFOUNDATION Functionality and application hierarchy. When icFoundation is installed, a default Site may be loaded into the system. Multiple sites may be added as needed (i.e., Intranet, Extranet, and various Internet sites) through the Multiple Sites sub-menu option.

The properties of the Site may be modified to reflect the preferred Site Name, Site URL, and the like. Each Site's colors, frame-set style, fonts, name and description may be configured using the Site Style Wizard. The Site Style Wizard icon may be located on the Results Tab of the Manage Sites sub menu option.

A default System Setup record may be added when icFoundation is installed; this record should not be deleted. The global properties of the system may be configured after the installation of icFoundation. The global properties include default retry intervals for IVR settings, fax, email transmissions, and file directories.

When icFoundation is installed, the Administration, Help, and Reporting menus may be loaded. As custom applications are developed utilizing icFoundation, the main-menus representation and sub-menus may be created.

After determining the functionality of each application created or being deployed with icFoundation, User Groups may be created in order to access the different areas of functionality.

If the application deployed with icFoundation generates reports, one should determine which User Groups may have access to each report. Navigation and report permissions may be assigned to each group to determine the menus presented to the user when they log on.

Each user's account information, including email address (when the user account is activated, the user may automatically be notified of his new password and PIN by email) may be collected. Each user may be mapped to their appropriate office and user groups. Each user may be a member of multiple groups; the user may inherit the sum of all of the group's permissions.

The ability to add, delete, and update Users may depend on the permissions set by the Administrator. The Manage Groups Sub-menu option uses the standard icFoundation procedures for searching, updating, viewing, adding, and deleting.

A User with the appropriate permissions may create an Office Type and Office Accounts. An Office Type category may be created before an Office may be added. After creating an office, User accounts may be assigned to that office.

Users may be readily assigned to various groups through the Add Users to Groups Sub-menu option. By allowing Users to be assigned to groups, multiple Users may easily be configured and assigned permissions by placing all the Users in a particular Group and configuring this Group accordingly. Users may be assigned to multiple Groups and multiple Users may be included in each Group.

Permissions are defined for the menus and web pages a User may access when they log on to the icFoundation site. Permissions are also defined for special business processes, such as the ability to approve an order and edit all User accounts. Permissions may be set to allow users read-only or full access to data presented on forms. "Administrative" permissions allow support people to use the same User interface and forms as a regular User. Permissions for each group are configured in the Group Permissions Sub-menu.

Permissions may be applied to three areas: Navigation, Reports, and IVR. Groups which are assigned permissions in the Navigation and Reports tabs may be directly related to the appearance of the Main Menu and Sub Menus. Permissions assigned in the IVR tab give the Group access to assigned IVR functions.

The Add Users to Sites functionality is geared towards a customer with more than one site. If only one site is to be maintained, the administrator may skip this section.

Various functions are logged to the system database and utilized for usage analysis and billing: Events, Reports and User time on-line data may be tracked. A combination of all three may be used to bill a customer for utilizing the system.

An unlimited number of billing matrices may be pre-defined. Matrix properties include a base rate and up to ten tiers of rates, each with a maximum and minimum value and an associated rate. The setup for each user account includes an attribute titled "Billing Group". The "Billing Group" may comprise a user group from which this account may derive its Event and report billing matrices. The setup for each user account also includes an attribute titled "Billing ID". "Billing ID" may comprise a billing matrix which may be applied to this user's time on-line usage.

Any Event may be mapped to a pre-defined billing matrix for each user group. This allows administrators to setup different rate schedules for different user groups, for each event. Also, any Report may be mapped to a pre-defined billing matrix for each user group. When a report is processed, information may be logged: User Name, Report ID, and date/time of the report.

Errors, warnings, and audits are termed "Events". Custom events may be added to the system to track custom occurrences, such as; change in sales volume, the check of an order status, or the download of a file. Errors, warnings, and audits and custom events may be configured to notify users when they occur.

Multiple Support Types may be configured so users may be notified when the events occur, at varying time of the day. Users may also be billed when specific events occur by assigning a billing matrix to each event.

Default event settings may be modified using the User Messages sub-menu option. External processes may also be triggered to run when any message occurs. An external process could be a batch file or an executable file with command line arguments.

Figure 2:
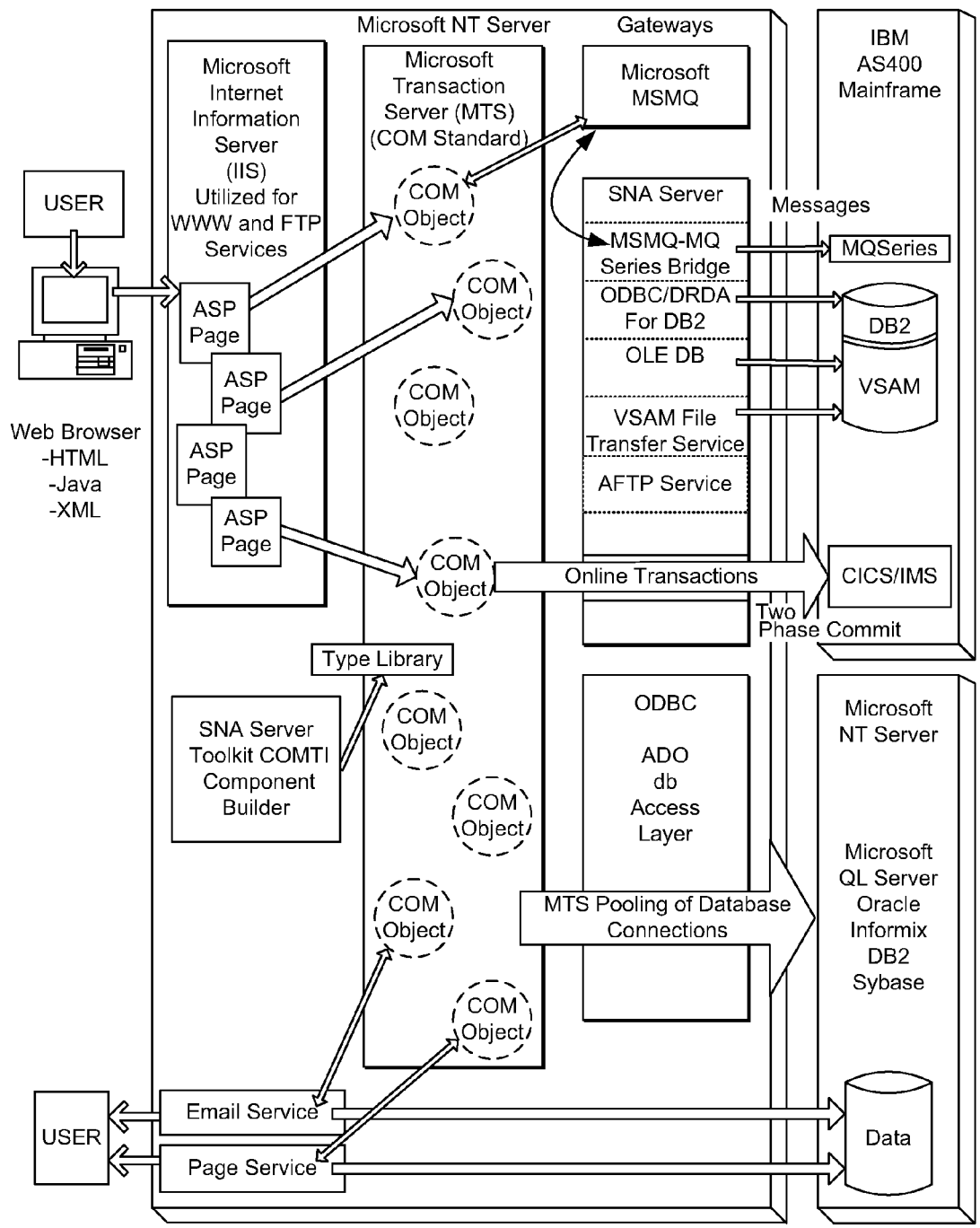
FIG. 2 is a flowchart illustrating icFOUNDATION Architecture.

FIG. 2 is a flowchart illustrating icFOUNDATION Architecture. The N-Tier icFoundation architecture may comprise many components. The icFoundation product may comprise COM objects, Active Server Pages (ASP), Database Tables and NT Services. These components are tightly integrated with Microsoft Windows NT Server. The ASP Pages are processed by Microsoft Internet Information Server (IIS). The COM objects are managed and scaled using Microsoft Transaction Server (MTS). The Services run under NT as NT Services.

Individual objects may use the following Microsoft Technologies:
1. Windows Management Interface (WMI) for starting and stopping of NT Services.
2. Coloraborative Data Objects (CDO) and the Microsoft SMTP Service for sending of email.
3. CRYPTO API for encryption of data using standard algorithms.
4. ActiveX Data Objects (ADO) for database access.

This architecture allows for Distribution of objects among N-tiers in a systems and also allows for scalability by being able to add multiple servers in a web farm or clustered environment. icFoundation may be typically configured in a three tier environment where the Presentation Tier formats HTML to be displayed in a browser, the Business Tier performs any business logic and connects to databases and legacy systems and the Data Tier performs data storage, queries and manipulation. The following is a brief summary of how the icFoundation product may be configured in a three tier architecture.

Presentation Tier—The icFoundation product may comprise hundreds of Active Server Pages (ASP) which communicate with the Business Tier COM objects and send HTML to the web browser. These ASP pages may actually comprise scripts with a mix of VBScript, JavaScript and HTML. These scripts may be processed on the server through Microsoft Internet Information Server.

Business Tier—The icFoundation product may comprise 23 COM objects which communicate with the Data Tier to process business rules and query data. COM objects may comprise compiled Visual Basic 6.0 ActiveX DLLS which conform to the Component Object Model (COM) standard. The icFoundation product may comprise 23 COM objects. Each COM object may comprise many class files which contain several code functions and/or sub-routines. These functions provide the "business-rule" processing for the icFoundation product. These processes include creating sites, user groups, users, menus, assigning permissions and may other business rules.

Data Tier—The icFoundation product may utilize 48 database tables to store information used to configure sites, users, groups, permissions, menus, audits, logs, and statistics.

Figure 3:
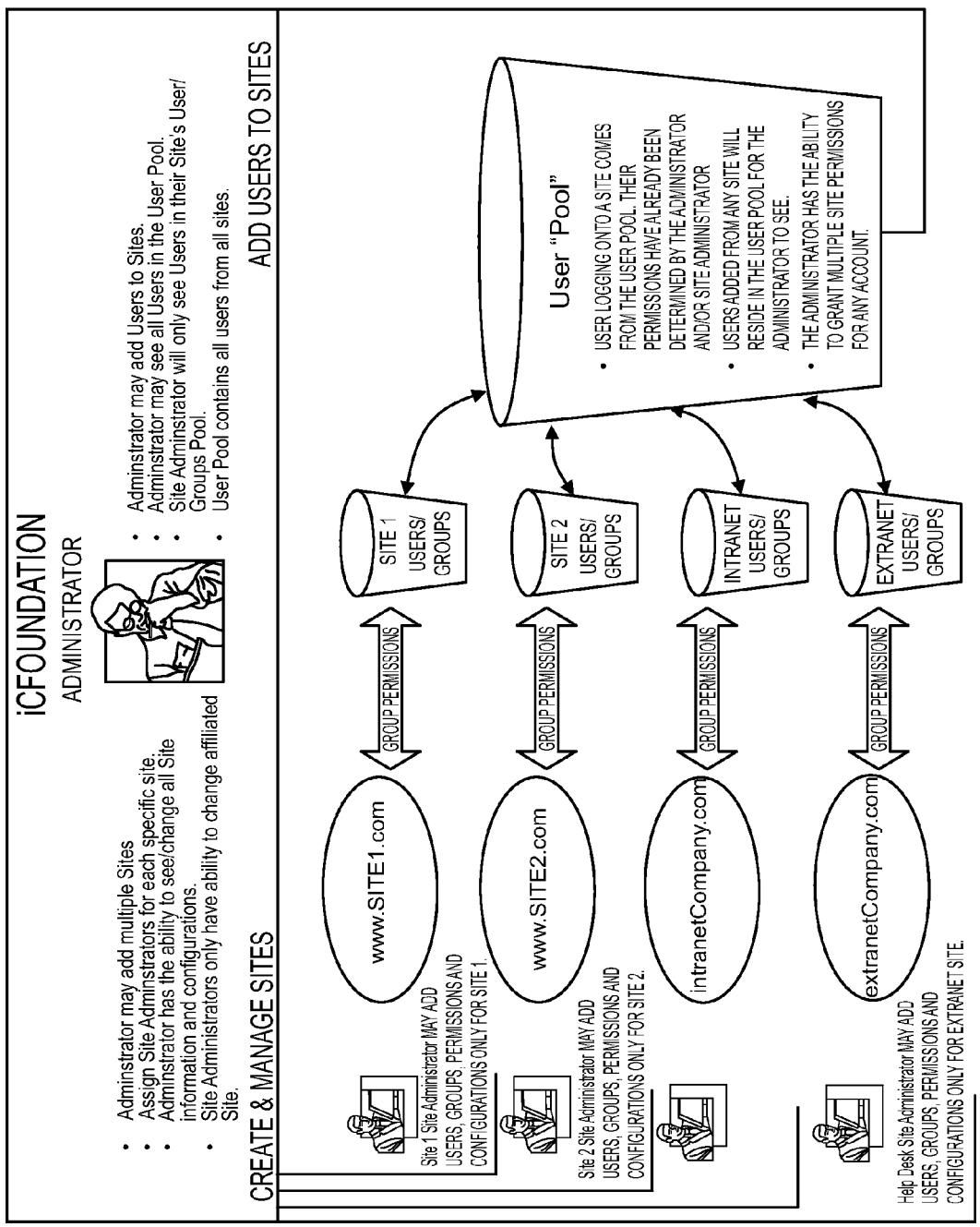
FIG. 3 is a flowchart illustrating the icFOUNDATION Site Configuration.

FIG. 3 is a flowchart illustrating the icFOUNDATION Site Configuration. The icFoundation product allows for multiple "sites" or user interfaces to information. Each of these sites may be configured to have their own functionality, pages, users, groups, reports, menus, logos, colors, fonts and style. These sites may be administrated from a single site or from each site individually. The administrators may configure groups of users who may in turn manage individual pieces of each site such as who manages user accounts, who manages permissions, who manages site logos, colors and menus, who manages the audit logs and security settings.

All sites may run from the same icFoundation database for easy management and may be used to "brand" identical sites with different colors and logos for different groups of users or customers. All sites run off of the same ASP pages and IP address assigned in IIS. This simplifies management by managing a single set of ASP pages and components instead of many sets of the same pages. Additionally, multiple function sites may be configured and managed using the icFoundation multi-site architecture. Examples of this are having a Intranet Site, Support Site, Extranet Site and Public Web Site all managed by the same user interface.

Figure 4A:
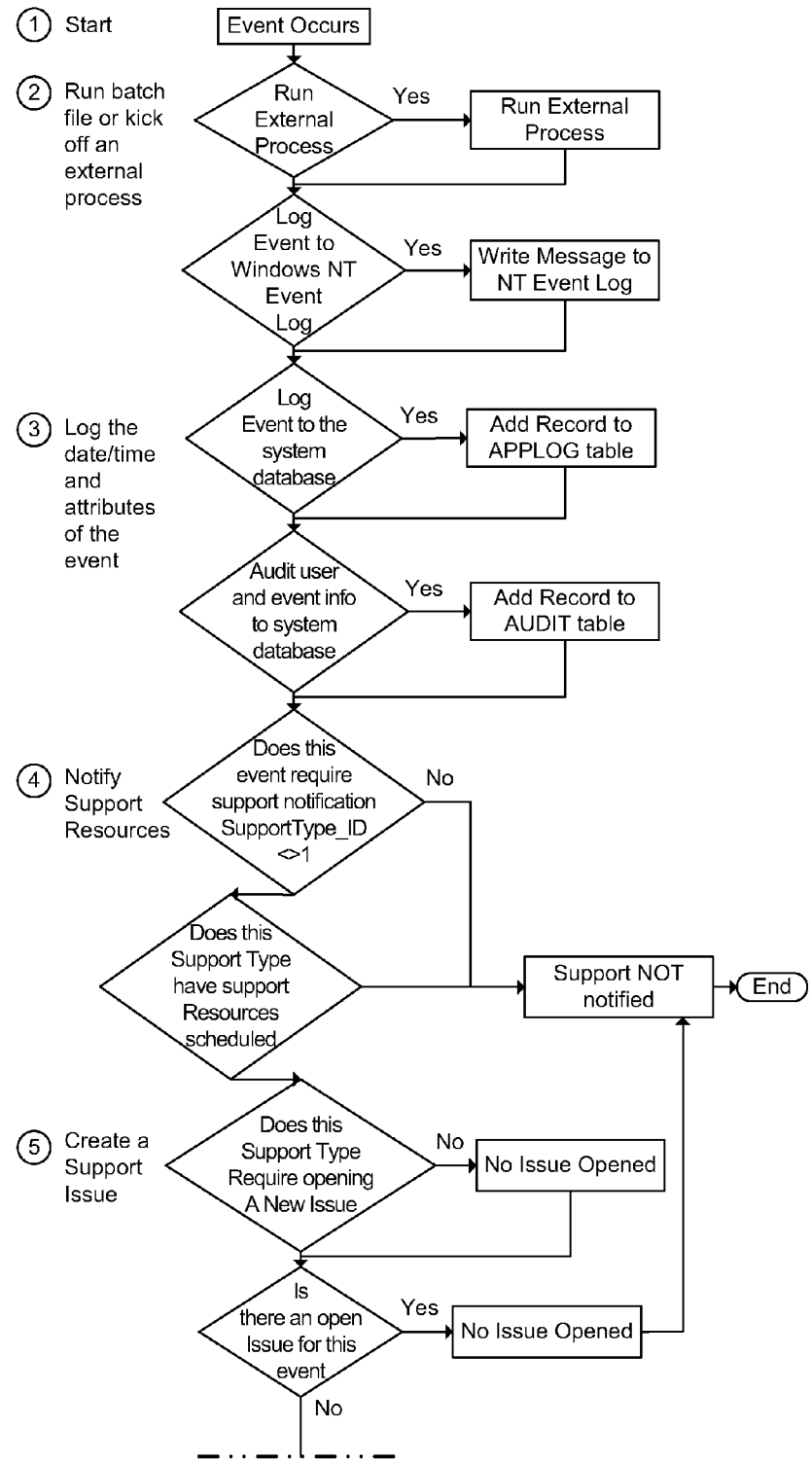
FIG. 4 is a flowchart illustrating Event Management Workflow.
Figure 4B:
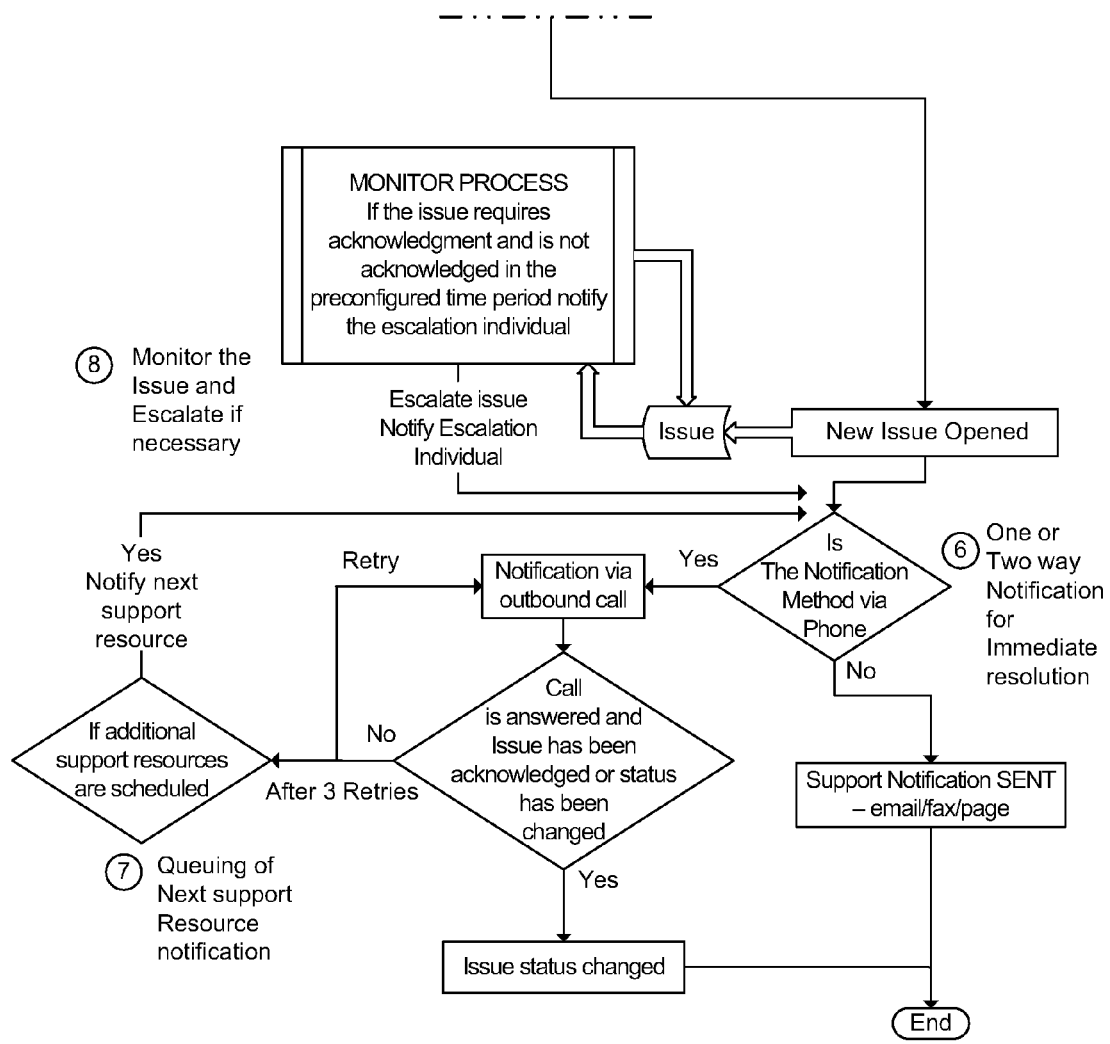

FIG. 4 is a flowchart illustrating Event Management Workflow. Errors, warnings, and audits are termed "Events" or "User Messages". Custom events may be added to the system to track custom occurrences, such as change in sales volume, check of an order status, or download of a file. Errors, warnings, and audits and custom events may be configured to notify users when they occur. Multiple Support Types may be configured so users may be notified when an event occurs, at varying times of day.

Users may also be billed when specific events occur by assigning a billing matrix to each event. User Messages Default event settings may be modified using the User Messages sub-menu option. External processes may also be triggered to run when any message occurs. An external process could be a batch file or an executable file with command line arguments.

Errors, Warnings, audits, and custom events may be configured to notify users when they occur. Each event may be mapped to a single Support Type and thus determine the type of automated support which may occur when the event occurs. Support Types may be configured for help desk support when errors and warnings occur. Support Types may also be configured for different departments within the company, which may in turn manage events for different applications, such as Order Entry versus Intranet events. Default support settings may be modified using the Manage Support sub-menu option.

Multiple Support Types may have multiple support resources (personnel) associated with it. Support resources could be help desk individuals, customer support representatives, department heads, managers, or other individuals who need to be notified when an event occurs. Support Resources may be scheduled to be notified by email, page, phone, or fax at different hours each day.

There are approximately 700 events defined in the standard installation of the icFoundation product. These events include the occurrence of errors, warnings and system audits which occur in the icFoundation COM objects and Services. An unlimited number of events may be added to the database and incorporated to new COM objects and services as applications are built on top of icFoundation.

The icFoundation MTXUserMsg.dll COM object contains all of the required functions to process the events when they occur. The Audit and AppLog tables store the date/time, event number, server and user logged on when the event occurred.

The icFoundation MTXMessaging.dll COM object manages the description and processes to perform when an event occurs. These settings for all events are stored in the icFoundation UserMsg table.

The icFoundation MTXSupport.dll COM object manages the support types, support schedule and support resource management to configure the assignment of who gets notified when each event occurs. These settings are stored in the SupportType, SupportSchedule, SupportResource and SupportIssue tables.

Events may be managed from the ADMIN/Manage User Messages screen in the icFoundation management site. From this screen all properties for each event may be configured.

1. Events, Support Types, Support Resources and Support Schedule are configured in the icFoundation management screens.
2. An event occurs such as an error, warning or Audit.
3. The icFoundation MTXUserMsg.dll queries the UserMsg table and gets the properties of the event knowing the event number.
4. This object processes the event depending on these properties.
5. If a value is contained in the External Process property then this executable or batch file may be ran on the server. The executable or batch file may perform any function the administrator configured it to perform on the server such as delete a file.
6. If Log to NT Event Log property is set to TRUE (−1) then the object may add a record to the Windows NT Event Log with the description and cause of the event contained in the UserMsg table for this particular event.
7. If Log to Application Log property is set to TRUE (−1) then the object may add a record to the AppLog table in the icFoundation database with the description and cause of the event contained in the UserMsg table for this particular event.
8. If Log to Audit Log property is set to TRUE (−1) then the object may add a record to the Audit table in the icFoundation database with the description, cause, date/time, server and user ID of the event contained in the UserMsg table for this particular event.
9. If the Support Type property for the event contains a value other than a 1 then the MTXUserMsg object may notify support by following the following processes.
10. If the Support Type property has support resources (personnel) scheduled to be notified for this event then it may query the Support tables to determine who and how to notify the individual(s).
11. If the Support Type requires opening of a new issue when this event occurs then a record may be added to the SupportIssue table containing the event number, description, cause and the user who was logged on when the event occurred.

A support issue may comprise a ticket containing the resolution status of an event which occurs. These tickets may be configured to be auto-generated when an event occurs for each support type. Individual tickets contain detailed information about the event and also workflow fields for issue resolution.

Each Support Type may be configured to open a new Support Issue when an event occurs. Support Types are managed from the ADMIN/Manage Support screen in the icFoundation management site. Issues may be viewed, approved and resolved using the ADMIN/Manage Issues screen in the icFoundation management site.

1. Events, Support Types, Support Resources and Support Schedule are configured in the icFoundation management screens.
2. An event occurs with a support type configured to open a new issue with each event occurrence.

3. A record may be added to the icFoundation SupportIssue table with a status of PENDING REVIEW.
4. If the support type for this issue requires which the issue be approved before it may be worked or processed then the approval person may be notified of the event.
5. If the issue is approved then the issue status may be updated to PENDING RESOLUTION.
6. Support resources may be notified and be able to resolve the issue and update the record with the resolution.

Billing Types are managed from the ADMIN/Manage Billing screen in the icFoundation management site. The ADMIN/Assign To Reports and Assign to Events screens are used to assign Billing types to events and reports.

1. Billing Types may be created and configured with the reference number, description, base rate, and rate schedule for each Billing Type.
2. Billing user groups may be created to associate billing types (rate schedules) to.
3. Billing Types (rate schedules) are associated with each billing user group and with each event.
4. Billing Types (rate schedules) are associated with each billing user group and with each report.
5. Properties may be configured for each user account including Billing Group which determines the user group the user may be a member of an use the rate schedules from for the events and reports.
6. Properties may be configured for each user account including Billing ID which determines the Billing Type (rate schedule) which may apply to the user for time-online billing.
7. Auditing may be turned on for each event which may be billed. Auditing may be turned on by setting the UserMsg.UseAudit field to TRUE (−1) for each event which may be billed.
8. When events occur the user who was logged and performed the event may be logged to the Audit table.
9. When a user runs a report it may be logged one of the queue tables including Email, Fax and HTML.
10. Each time the user logs on to the site a record may be added to the LogonLog table which contains the date/time the user logged on and their time online.
11. Billing and Usage may be determined by queries performed on the Audit table sorted by user account and event.

Figure 5:
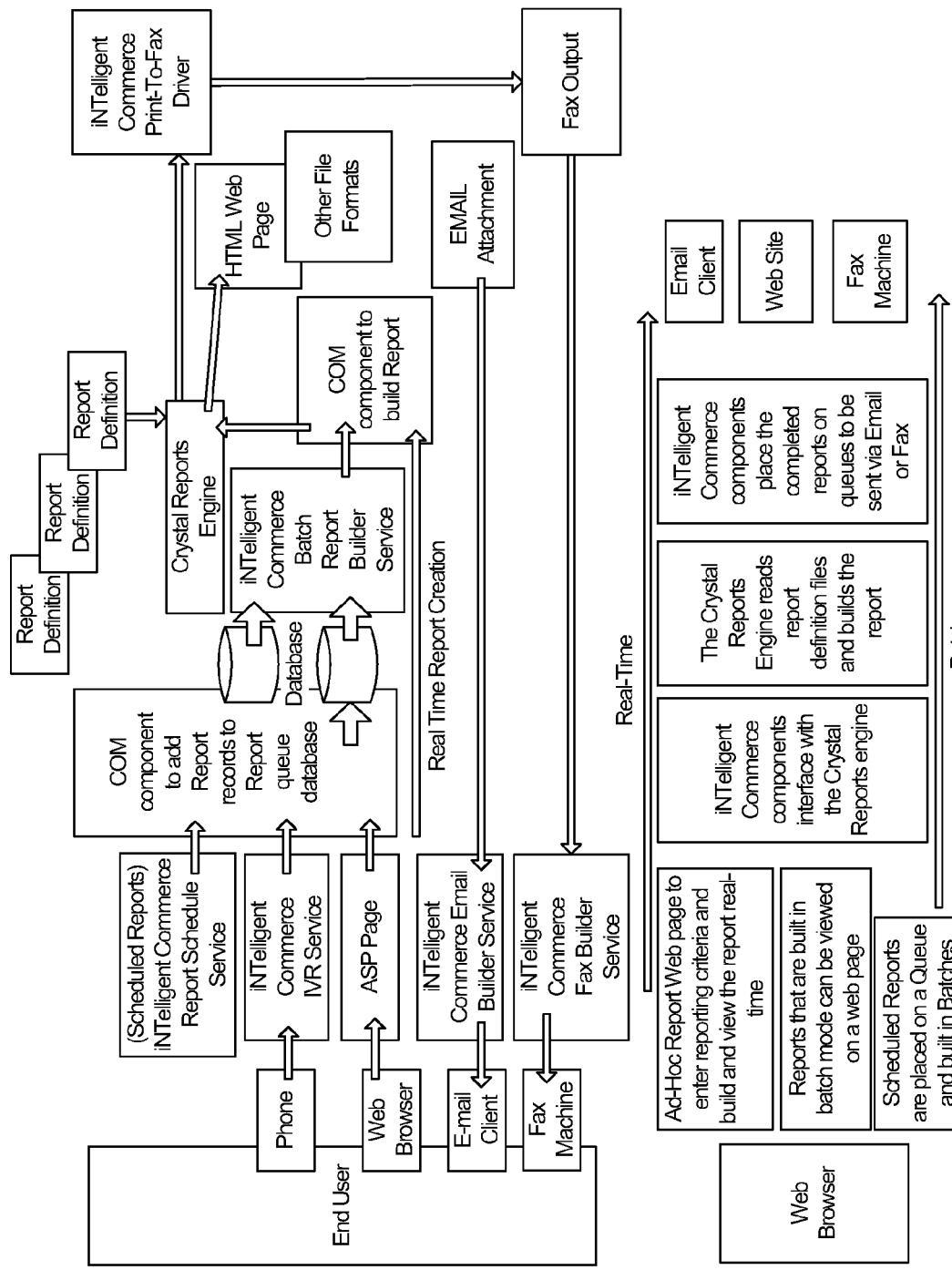
FIG. 5 is a flowchart illustrating Reporting Management.

FIG. 5 is a flowchart illustrating Reporting Management. The icFoundation reporting infrastructure includes the following four functions. End users have the ability to Download reports in common formats such as Word, Excel, ASCII and others. End users have the ability to view reports in their web browser. End users have the ability to forward reports to multiple users via email and fax. End users and administrators may schedule reports to be emailed or faxed to multiple user accounts on a regular basis such as daily, weekly and monthly.

The reporting infrastructure consists of many icFoundation components which work together to send the reports. These components include: Report Scheduler Service (icScheduler.exe)—This icFoundation executable schedules reports to be delivered on a regular basis. IVR Service (icIVR.exe and icIVRRetrieveReport.exe)—These executables allow retrieval of reports by using a touch tone telephone. The reports are then sent to the user via email or fax. ASP Page—This script allows selection, viewing and downloading of reports. This ASP page calls the icFoundation MTXQueue.dll which adds records to the email or fax queue tables in the database.

The email and fax queue services may then pick up and send the email. Email Queue Service (buildemail.exe)—This executable reads email properties from a queue table in the database, creates the report attachments using the icFoundation MTXRunReport.dll and sends the report via email using the icFoundation MTXEmail.dll. Build Report Service (BuildFax.exe)—This executable reads fax properties from a queue table in the database, creates the report output files using the icFoundation MTXRunReport.dll and prints them using the icFoundation print to fax driver (icP2Fax.exe). Send Fax Service (icFaxQ.exe)—This executable sends fax documents.

icFoundation may include 20 standard environment reports. There may also be provided a reporting infrastructure for building and deploying an unlimited number of custom reports. Custom reports are designed to a standard allowing them to be integrated into icFoundation; this allows them to benefit from the Filter and Preview in HTML functionality as well.

To secure reports, only assign specific user groups permissions to each report; this allows only authorized users to generate a particular report. Reports may be distributed in various ways, including real-time previewing using a web browser, downloading a report data in a file, forwarding of a report to external individuals via fax or email, and scheduled distribution of reports via email and/or fax. Reports may be scheduled for automatic distribution on a regular interval such as hourly, daily, weekly, and monthly.

Users with appropriate permissions may view Usage reports, an Audit Log and a System Log. These Logs detail any events, Report, or messages which have been activated while a user has been navigating through the icFoundation application.

icFoundation provides instructions, standards and templates on how to integrate with the following services. All of the services may be managed from web-based consoles, and each service includes its own report for statistics, status, and exceptions.

Scheduler Service—This service monitors the Schedule database and places faxes, emails and pages on to their respective Queues.

Fax Queue Service—This service monitors the Fax Queue database and pulls batches of faxes off of the queue and sends them. This updates the database with statistics such as transmission time and fax status. Busy or failed faxes are automatically scheduled to be re-sent.

Email Queue Service—This service monitors the Email queue database and pulls batches of emails off the queue and sends them, updating the database with the status of transmission.

Pager Queue Service—This service monitors the Pager Queue database and pulls batches of pages off of the queue and sends them, updating the database with the status of transmission.

Batch Report Service—This service monitors the Reports queue database and pulls batches of reports off of the queue and builds them, updating the database with the status of the processing.

Print-To-Fax Driver—This program acts as a virtual printer on the machine upon which it is installed. When documents are queued to this printer, they are converted to a faxable document.

Report Types and Reports may be managed from the ADMIN/Manage Reports screen in the icFoundation management site. Report Parameters are managed from the ADMIN/Report Parameters screen in the icFoundation management site. To process a report, the following steps may occur:

1. Select the Reports Main Menu option. The Reports Home page may appear.
2. At Reports Home Page, the sub menu changes to reflect the Report Types and Reports per Report Type.
3. Select the Report Type, then select the appropriate Report. (Example: Report Type—Audit Messaging Report—User Messages)
4. The Report Parameters may appear for the specified Report (Example: User Messages)
   a) To View the report, verify "View in Browser" radio button is selected (View in Browser is default selection) click on the Run Report button.
   b) To Download the report, select the "Download this report as a file" radio button. Select the file format needed (Word for Windows is default). Click on the Run Report button.
   c) To Email the report, select the "Email this report to" radio button. Type in the Email address, Email subject and file format. Click on the Run Report button.
5. If "Viewed in Browser", The report appears in the contents frame.

Figure 6:
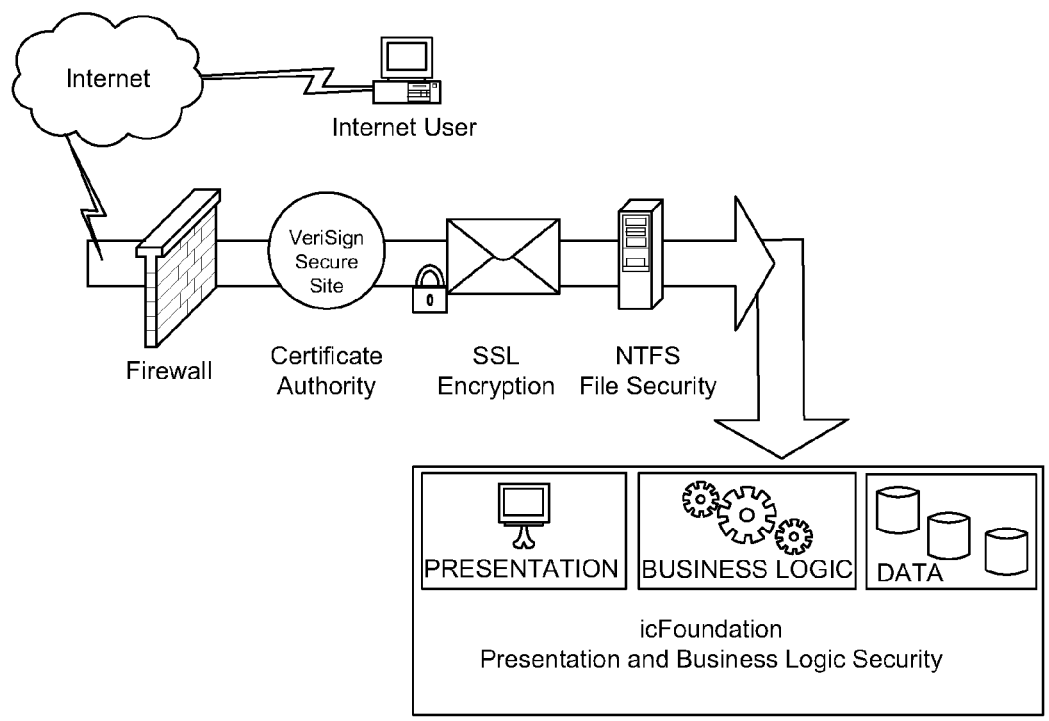
FIG. 6 is a flowchart illustrating Security Overview.

FIG. 6 is a flowchart illustrating Security Overview. The icFoundation product utilizes several levels of security from the NT operating system to special routines embedded in the icFoundation objects. The 5 levels of security include: NT File Security (NTFS)—This secures files stored on the web server. Standard NT user permissions are applied to directories on the server. IcFoundation uses several system level NT user accounts for page level security. End users do not have access to these accounts. SQL Server Login Security (or similar login security in other RDBMS)—This secures data in the database.

icFoundation may use several system level SQL Login accounts to access the data. End users do not have access to these SQL Login accounts. Microsoft Transaction Server (MTS) Role Based Security—This secures the object function calls into the database so only authorized users may access business logic. icFoundation uses several system level Roles to access the objects. End users have no access to these roles.

icFoundation Security Routines insure that icFoundation users only have access to menus, HTML/ASP pages and reports that they are authorized for by an icFoundation administrator. icFoundation Architecture utilizes server side scripts which retrieve data from the database, convert it to an HTML stream and send it to the browser. Data is generally not stored on the web server. Only the processing scripts and COM objects are located on the web server. These objects interact with the database to retrieve data and display it to the end user in the browser.

The ASP scripts process the COM object calls which connect to the database. These ASP scripts display the data realtime to the end user in a stream of HTML. An actual HTML text file is not created and placed on the server. Therefore if the file system is compromised the actual data from the database is not lost. Only a portion of the script code may be accessed. This script code does not contain any data from the database.

FIG. 7 is a flowchart illustrating icWizard Overview. The COM/ASP wizard, which is included as part of the icFoundation product, is a utility to create Visual Basic COM Components. By selecting which options to include in the final output, you may customize the functionality of the final code. The icWizard process tokens in templates and merges multiple files into the final generated files. The icWizard also enforces the icFoundation naming and development standards, providing one seamless development environment.

COM Components For COM Components, the icWizard provides:
1. VB source code which makes up the COM component
2. Database functionality (ADO)
3. Standard error handling and multilingual user messages
4. Microsoft Transaction Server (MTS) infrastructure and role-based security
5. Auditing of functions
6. Data validation before database updates
7. Required field checking before updating the database
8. Replacing single quotes and double quotes before updating the database
9. Function header comments, input parameters, output parameters, function description, return values, and the like
10. Creates Visual Basic source code including: .vbp (Visual Basic Project File) and get data, save data, and delete data classes.
11. Enforcement of icFoundation naming and development standards ASP Pages For ASP Pages, the icWizard provides:
1. ASP code providing integration with the COM components and presentation of search, add, edit, and delete user interfaces in HTML.
2. Enforcement of icFoundation naming and development standards
3. Page security and initialization functions
4. Standard styles and colors
5. Standard footer
6. Standard error and warning dialog boxes Other icWizard Functionality:
1. Provides the developer with a help file
2. Creates end-user help pages detailing how to use the newly generated user interface
3. Updates the database with standard errors, and audits for the functions it creates
4. Creates SQL script files for migrating data across servers The icFoundation® product provides an infrastructure for web applications developed on Windows 2000. This infrastructure may include security, user management, site management, presentation, auditing, billing, event notifications, reporting and multiple site branding. The icFoundation object model may also provide common business logic for web, wireless and IVR applications. icFoundation provides a robust, thin browser based user interface to interact with the standard icFoundation object model. This user interface may be used for management and configuration of all icFoundation parameters.

Microsoft BizTalk Server 2000 enables the development and management of application integration within and between organizations using the universal standard of XML. BizTalk Server 2000 (BTS) provides comprehensive process management and is a platform for reliable business document interchange and business processes integration. BTS uses Windows 2000, SQL Server 2000 and Host Integration Server 2000 server products as the underlying technology components.

BTS may comprise two major components including an orchestration workflow engine and an XML-based messaging engine. Workflows are orchestrated using the BizTalk Application Developer Desk. This Visio-based application visually depicts the business processes to be performed and the implementation of those processes or messages. This visual depiction may then be converted to an XML dialect called XLANG. The BizTalk Scheduler then executes this workflow against documents received by BTS.

A Message may comprise a single BTS transaction or business process typically made up of an incoming document in XML, EDI or other format. Messages may be sent to BTS using many common protocols such as HTTP, HTTPS, FTP, file and others. Each message type has a published schema, which determines the format of the data in the message. This "external" or "incoming" message enters BTS through a channel into a published external schema. The message's destination or delivery option is an AIC, Orchestration, HTTP, File, MSMQ, FTP or other protocol. In most cases icFoundation may use an AIC or an Orchestration.

BizTalk Messaging may accept XML, EDI or other documents from external or internal applications. These documents may be converted to XML, mapped to a new form and delivered to trading partners, Orchestration Workflows or Application Integration Components (AIC). AICs are custom-built COM objects which talk to external systems such as SAP, ODBC, J. D. Edwards, McHugh and others. An Application Integration Component (AIC) may comprise a COM objects which may accept the entire XML message document, parse it and pass it to a standard icFoundation COM object. AICs implement a standard COM interface published by BTS.

Orchestration is a visual drag-and-drop environment based on the Visio graphics tool and used to design document workflows. A document is created which may then be converted into an XLANG schedule. This schedule is then executed in response to a message. Workflows implement long-running transactions and are designed to separate business analysis from the implementation details of the schedule.

icFoundation enhances BizTalk by adding message process security, schema management, standard error handling and standard messages for account management and report retrieval. BizTalk orchestrations and AICs may also take advantage of icFoundation objects including its security, auditing, billing, email, fax and page queuing. icFoundation also enhances BTS by providing a user interface for partners to view transaction activity reports and authorized message schema definitions.

An XML schema defines the valid format for a class of XML documents. The form of XML schema used by BTS is XML-Data Reduced (XDR). This alternative to traditional Document Type Definitions (DTD's) represents the format as an XML document and allows representing formats other than XML documents (files, EDI, and the like) and data types.

FIG. 8 is a diagram depicting a framework for Internet based applications using BizTalk Server 2000 and icFoundation.

The BizTalk Framework assumes that application programs are distinct entities, and application integration takes place using a loosely coupled, message-passing approach. There is no need for a common object model, programming language, network protocol, database or operating system for two applications to exchange XML messages formatted using the BizTalk Framework. The two applications simply need to be able to format, transmit, receive and consume a standardized XML message.

Messages are the basis for the most significant contributions of the BizTalk Framework. A message flow between two or more applications is a means to integrate applications at the business-process level by defining a loosely coupled, request-based communication process. Since many business processes involve one party performing a service at the request of another party, the mapping of messages to requests is natural. Approaches making tighter integration demands such as those based on special programming languages or shared distributed computing "platforms," are highly appropriate to tightly connected applications on single machines or in controlled environments, but they do not adequately support distributed, loosely coupled, extensible business process integration. An XML-based messaging system with open, extensible wire formats captures the essentials of a business communication while allowing flexible implementations.

It is anticipated that the vast majority of interchanges—the exchange of XML documents and messages between trading partners or applications—implemented using the BizTalk Framework may use a simple HTTP post transport but business may also use other transports including FTP and message queuing technologies including IBM Corp.'s MQSeries and the Microsoft Message Queue Server.

Since few software applications today provide native support for XML, it is anticipated that businesses and software companies implementing layers of adapters to enable their existing applications to participate in the first generation of BizTalk Framework interchanges. For many applications, these adapters take an existing function call, translate it into an XML document, and route the document to a target destination, whether it is a trading partner or another application within a corporate Internet. Until applications have native support for XML, these types of BizTalk Framework interchanges may require layers of software which transforms native data types into XML and then performs the XML document routing. The BizTalk Framework may also provide support for schemas describing more complex interchanges involving these types of XML document transformers and routers in-house. Microsoft is developing a BizTalk Server 2000 which automates many of the functions required in a BizTalk Framework interchange.

There are limitation to the prior art implementations of BizTalk. The present implementation of BizTalk may require a BTS Channel be setup for each message type for each partner. Managing a large amount of partners or message types becomes a difficult task. Enrollment of new partners requires interaction with the BTS management desk and duplication of channels and ports. A BizTalk channel defines an interaction which may be received by BTS. Specifically, a channel defines the source organization, input/output document types and any mapping which may be performed on an incoming XML document.

When an XML document is received through a BizTalk channel, it is delivered to a port. The port determines the method of delivery for the document. It defines the destination organization or application to receive the document and how it may be delivered by BizTalk (HTTP, AIC, Orchestration, STMP, and the like).

In addition, in BizTalk, there is no "partner" based transaction reporting. The present reporting interface consists of a single web page sample, which is meant for administrators to view transaction activity for all message types for all partners. Moreover, in BizTalk, there is no interface for "partners" to view message types they are authorized for or their schemas. These schemas are required for development of the XML messages. There are also no standard acknowledgments or error messages have been defined. BTS does not include any standard message types.

icFoundation Solves most if not all of these BizTalk Limitations. Each partner may be issued a standard icFoundation login account. Each message may contain the standard icFoundation Authentication XML elements. Multiple partners may be able to send messages through the same channel. Partners may be added and removed without administrative user interaction with the BTS management desk. Assignment of which partners may process which message type is configurable using the icFoundation web interface and may be changed real-time without interaction with the BTS server(s). Partners may logon to an icFoundation web site and view their authorized message types and full schema detail. This solution eliminates having duplicate channels in BTS for each message type for each partner.

An icFoundation web site may be provided to allow "partners" to logon and view various transaction activity reports. These reports may be filtered to only allow viewing of the logged on partner's transaction activity. An icFoundation web site may also be provided to allow "partners" to logon and view schemas, sample XML implementations and detailed documentation. Administrators may configure what message types each partner is authorized for by using the icFoundation group permissions screens.

icFoundation provides standard XML schemas for error messages. icFoundation also provides a rich event based notification system. Each error may be managed through the icFoundation web interface. icFoundation provides Account Management and Report delivery message types, schemas and implementation samples.

Each source sending a BizTalk message may have an associated Login account in icFoundation. These users may be members of specific sites and user groups within icFoundation. Out of the box, icFoundation may include several "standard" messages which may be sent through BTS. The group permissions for new user groups may be given permission to these messages. Main Menus and Sub Menus may be created within icFoundation to support additional message types.

icFoundation supports management of permissions through a web interface. Each partner may be given permissions to send/receive BizTalk messages. Typically this is done using the BizTalk Management Desk and creating a channel for each message type for each partner. With many message types or partners this becomes challenging in the standard BizTalk Management Desk. icFoundation provides a web interface for mapping which transactions may be sent/received by individual usage groups. User groups may be set up by function such as "order placement", "user management", and the like. Partners may be added to usage groups to determine which message types they may process. Partners may logon to an icFoundation message site to view which message types they are authorized for. From this site they may view the detailed schemas for the message types and how to implement them.

Each message as it is passed through BizTalk messaging services or BizTalk Orchestration may include an icFoundation authentication routine to authenticate that the system accepts messages from this user. BTS may also utilize the icFoundation "Check Permission" routines to identify if the authenticated user may send the specific message type such as "change password request", "place order", "submit product update", "add new user", and the like. Permissions to each of these message types may be managed by the standard icFoundation security defined in the "Message Security Administration".

Message Security allows multiple remote locations (partners) to send messages to the same BizTalk channel. In a typical stand-alone install of BizTalk without icFoundation, administrators would have to create a channel for each message type for each partner. With many partners or channels, this becomes a difficult task. The icFoundation web administration screens and AICs allow multiple message types from multiple partners to be sent through a single BizTalk channel. This also allows for enrollment and automated addition of partners without adding channels using the BizTalk Management Desk.

Message Security determines which partners may process each message/transaction type. Standard user authentication XML elements have been defined to allow partners to add icFoundation authentication to each XML message. icFoundation AICs have been developed to process the authentication elements and determine if the user has permission to process the transaction. The AICs may be utilized from Orchestration or any custom AIC.

The Message Schema Administration is a screen within icFoundation, which allows administrators to configure a name, description, sample XML file, XML attribute/element field description file and schema file for each message. This data may be stored in the icFoundation database and used by the "Authorized Message Schema Viewing" ASP pages to dynamically build a "documentation" page to display to the end user the format of each message they may send.

icFoundation provides a web interface to display authorized XML schemas and all supporting documentation. The current version of BTS contains no medium to store schema documentation. Schemas are viewed in raw form with the BizTalk mapping tools. An icFoundation "Site" is used to display only authorized schemas for message types the partner is authorized to transact with the organization. This interface is similar to the BizTalk.org web site where schemas for various message types are stored and details on how to implement them may be viewed. These schemas are used by developers to send messages to the organization.

The standard icFoundation installation includes several functions, which are BizTalk enabled. These functions include user management and report retrieval. The standard functions include schemas, AICs and HTTP ASP page BTS channel drop points. These standard messages would allow customers to synchronize user management with any external system including NT, mainframe, UNIX or others.

icFoundation provides a foundation and set of standards for error messaging, auditing and warning notifications. icFoundation and its AICs which may be optimized for BizTalk include standards for XML based error messaging. This standard allows unified distribution of errors in message acknowledgements and logging to external systems. Multiple errors may be combined into a single XML stream.

Standard icFoundation report retrieval message types allow delivery of data in preformatted reports or raw format. Standard icFoundation reports and any reports added to icFoundation may be retrieved by a partner through an XML message. The XML message and report combination may be used as a sophisticated query and data retrieval system where the data is returned in formatted text, comma separated values, Word, Excel, PDF and other common formats. This allows a medium of data transfer between external platforms including UNIX and mainframes. Schemas for each report retrieval transaction are included.

Standard icFoundation account management message types allow user synchronization with external systems. User accounts may be managed through a series of standard icFoundation message types. These XML messages may be used to add users, modify users, delete users, add and remove group membership permissions, reset passwords and disable/enable accounts. Schemas for each user management transaction are included. This feature is key in synchronizing user account information between external platforms including UNIX and mainframes.

Sources sending messages to an icFoundation/BTS integrated site may run reports pertaining to only their account.

Presently, BizTalk does not segregate report data by channel and only allow certain individuals to view specific data. icFoundation thus extends the BizTalk database with transaction volume reporting and secures data between partners. The current version of BizTalk includes a sample web interface for administrators to view transaction statistics for all channels and partners. There is no interface for individual partners to logon and view only their data in a secure manner. The icFoundation web interface allows each partner to view statistics and transaction history information for only their transactions. These reports are used for capacity planning, transaction throughput analysis, billing, and determining success/fail of transactions.

Figure 9:
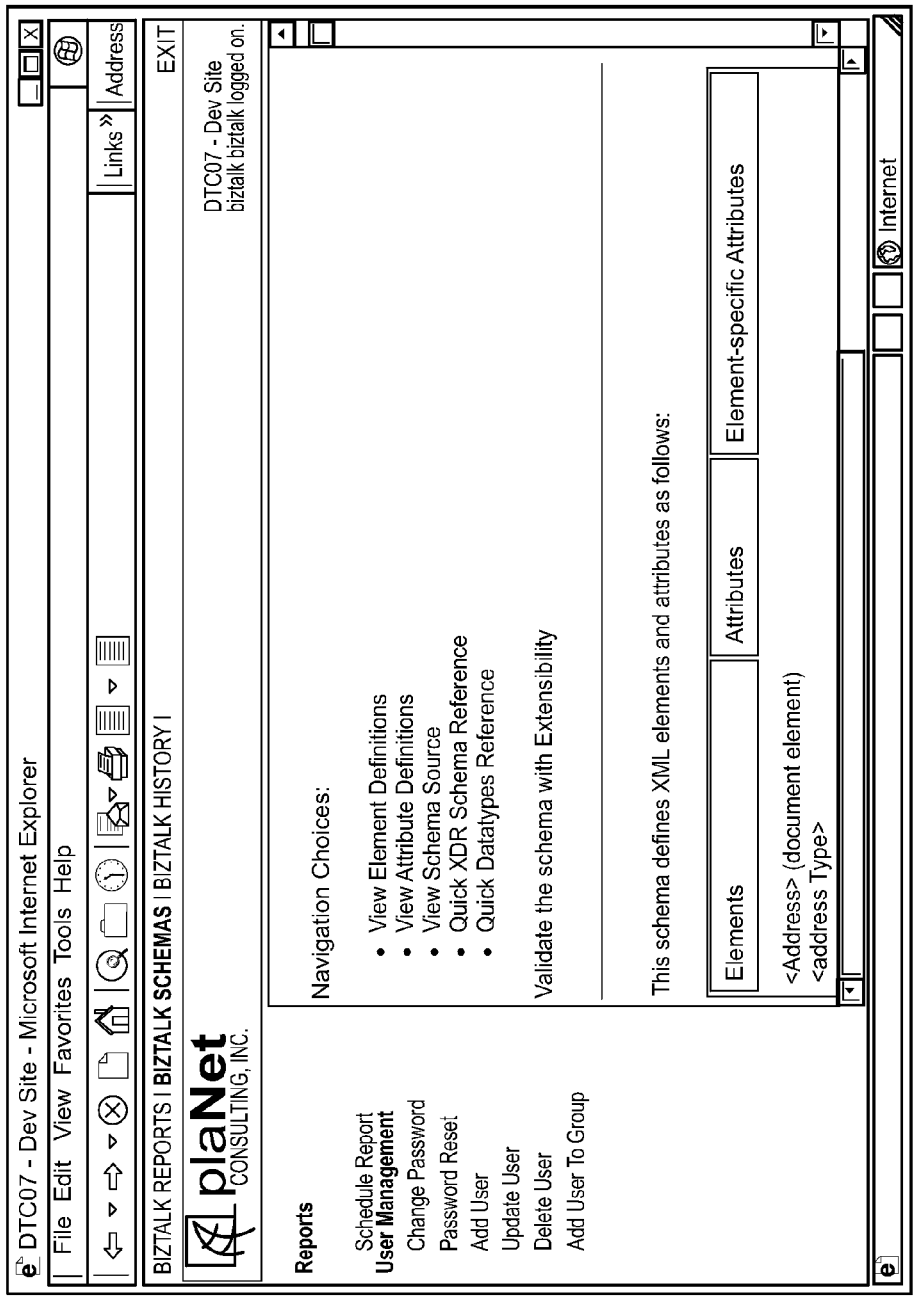
FIG. 9 is an example of a display screen for authorized message viewing.

FIG. 9 is an example of a display screen for authorized message viewing. Sources sending messages to an icFoundation/BTS integrated site may view all of their authorized messages which they may send. These sources login to icFoundation and may browse to each message type they are authorized for and also view the XML schema, samples and element definitions for each message. From this location, they may also view BTS message transmission statistics and history by reading the BizTalk tracking tables. The BizTalk Reports main menu represents a section where sources may view the schema for each report they are sending including parameters.

Figure 10:
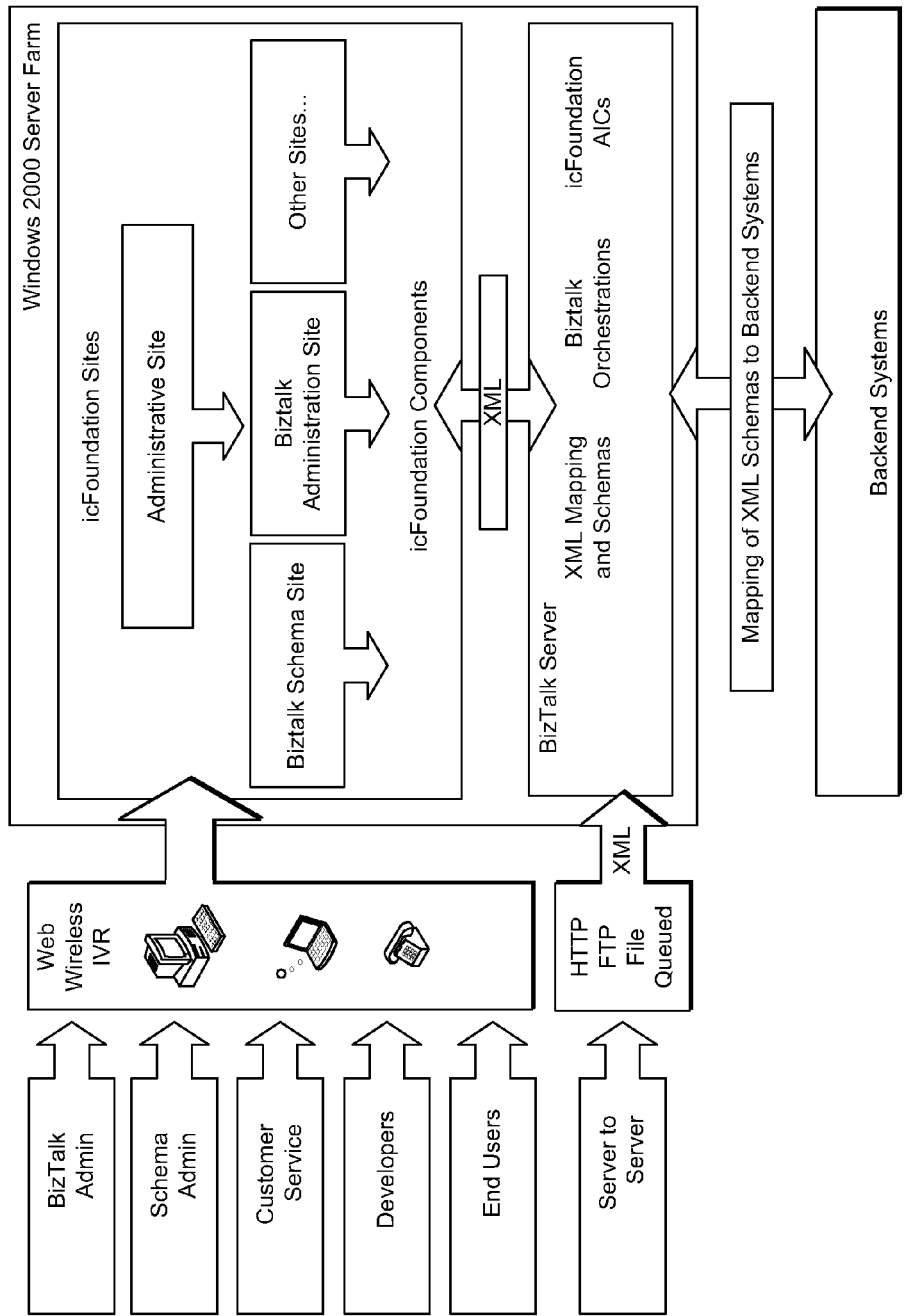
FIG. 10 is a block diagram of the icFoundation/Biztalk Site architecture.

FIG. 10 is a block diagram of the icFoundation/Biztalk Site architecture. User groups can manage multiple Biztalk icFoundation sites via web, wireless and IVR. The icFoundation sites utilize components and an XML communications layer to interact with the Biztalk engine. The Biztalk engine is mapped to various backend systems to translate data from the icFoundation sites to the backend. The boxes on the far left depict different user groups that can access the icFoundation via web, wireless and IVR. The boxes on the top right display example icFoundation sites used to manage a Biztalk implementation. The boxes on the bottom right depict the modules of the Biztalk engine used to map and translate data to various backend systems.

Figure 11:
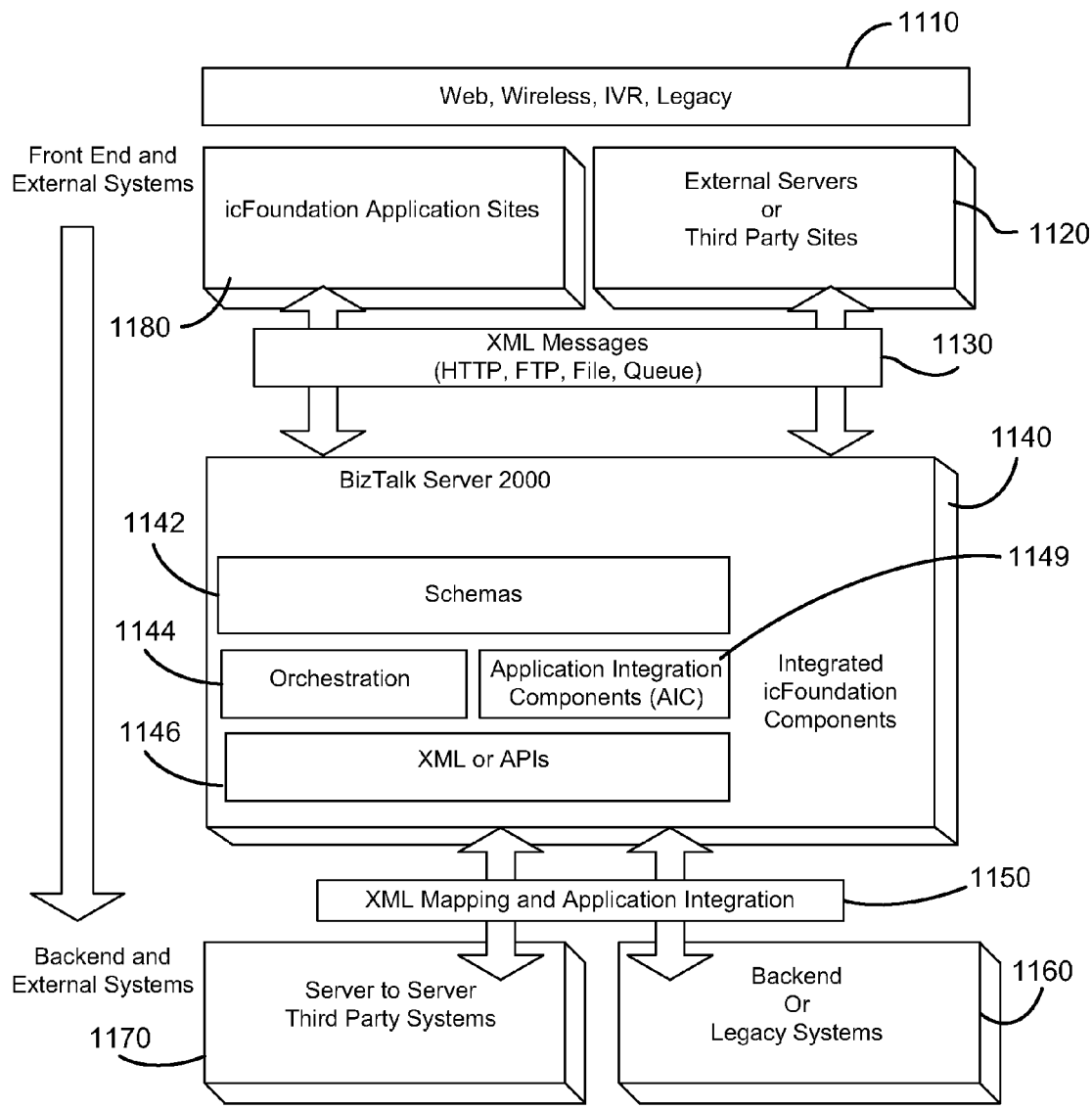
FIG. 11 is a block diagram illustrating an example of a icFoundation/BizTalk Implementation.

FIG. 11 is a block diagram illustrating an example of a icFoundation/BizTalk Implementation providing Universal Access to Centralized Business Rules. Web, wireless, IVR, and Legacy applications 1110 may be developed using icFoundation application sites 1180 for the user interface or external servers or third party sites 1120. These applications may take advantage of the common business logic offered by icFoundation. The data requested or retrieved using the icFoundation user interface 1180 may be created as an XML 1130 message and passed to BTS 1140 where it may get transformed into a format 1150 which may be recognized by backend or legacy system 1160 or server to server third party systems 1170. BTS 1140 in FIG. 11 may be enhanced by the integration of icFoundation Components 1148.

Additional web, wireless or external processes 1120 may utilize the same XML interface 1130 to transact with BTS 1140 using the same business rules. Transactions sent by these external applications 1120 may include the standard icFoundation authentication XML elements. The first step in any BTS orchestration 1144 or AICs 1149 is to process the authentication elements and determine if the application (partner) has permission to send the message.

BTS 1140 may be utilized to receive XML messages 1130, translate any data and interact with backend systems 1160 through XML documents 1150 or directly through APIs 1146. Trading partners may logon to icFoundation sites to view transaction statistics and view the schema definitions 1142 for each message type they may be authorized for.

Figure 12:
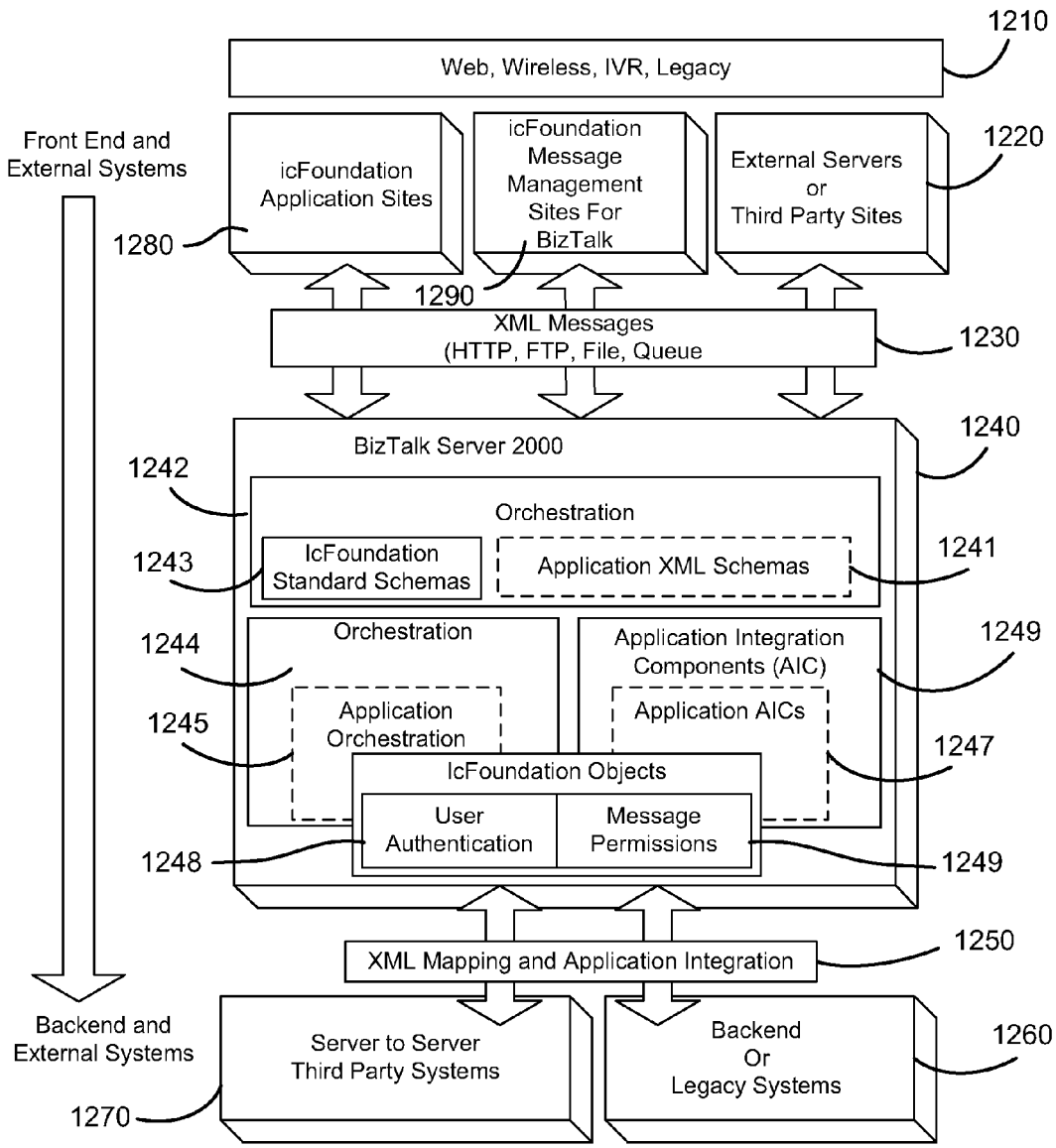
FIG. 12 is a block diagram illustrating an example of icFoundation/BizTalk Implementation enabling a Legacy system.

FIG. 12 is a block diagram illustrating an example of icFoundation/BizTalk Implementation enabling a Legacy system 1210. icFoundation embedded BizTalk 1240 may be used to enable a legacy system 1210 through icFoundation Application sites 1280, icFoundation Message Management Sites for BizTalk 1290, or External Servers or Third Party Sites 1220. icFoundation may be used in several pieces of the implementation including providing an infrastructure for web, wireless and IVR applications 1210.

This infrastructure may include user management, security, auditing, reporting, presentation, billing and event notifications. icFoundation provides a prebuilt web site to manage BizTalk schemas and detailed meta on how to implement them. icFoundation provides a prebuilt web site 1280, 1290 to manage which partners may send and receive each message type 1230. These components may include standard schemas, 1243, and AICs 1249.

icFoundation provides all the components to allow delivery of reports through an XML message 1230. icFoundation provides specialized AICs 1247 which may integrate with BizTalk Orchestration 1244 and AIC development 1249. These components 1246 provide authentication 1248 and security 1249 to messaging. Messages may be XML mapped 1250 to Server to Server Third Party systems 1270 and/or Backend or Legacy systems 1260.

Figure 13:
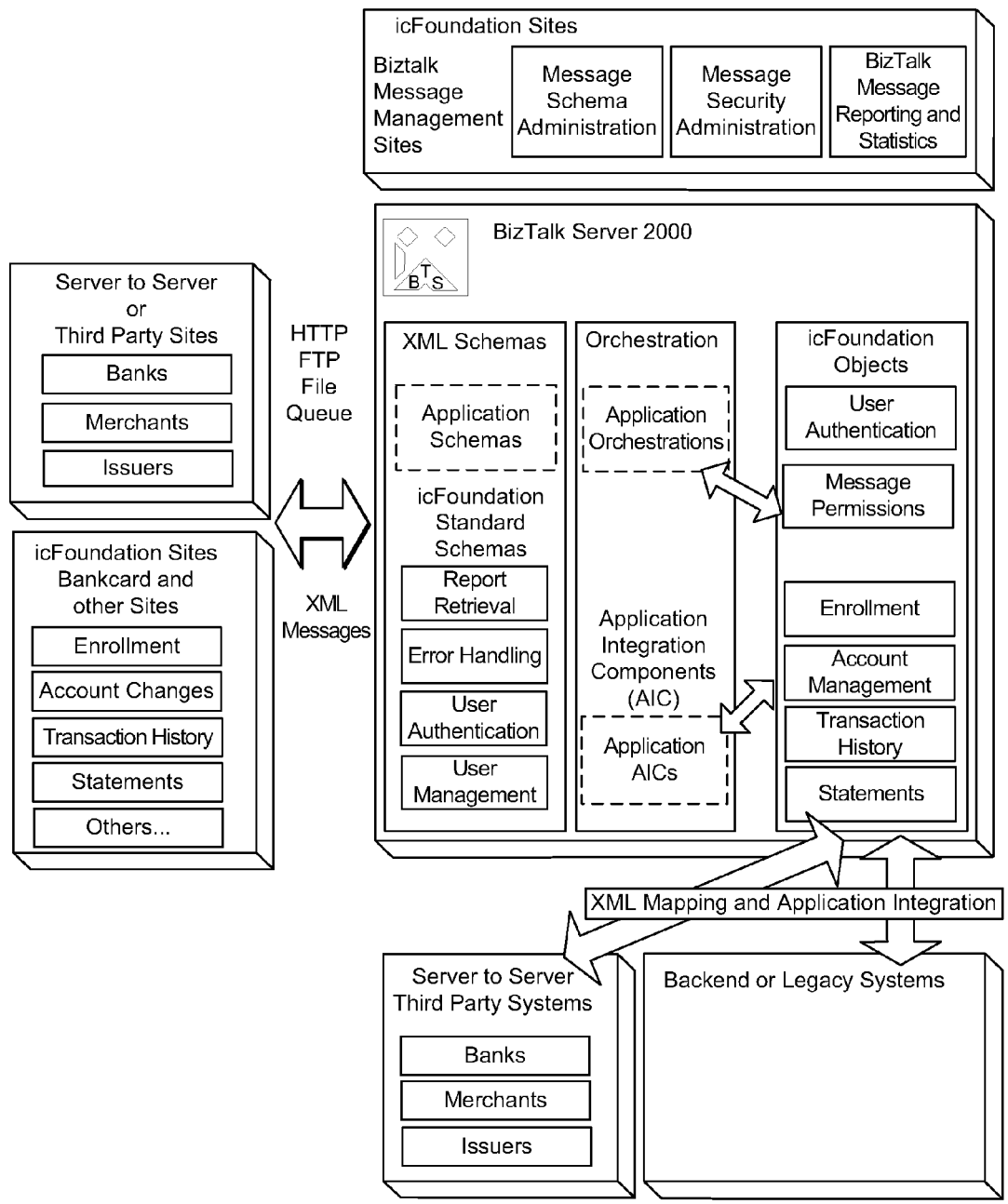
FIG. 13 is an example of the icFoundation embedded BizTalk application as applied to a Bankcard Site.

FIG. 13 is an example of the icFoundation embedded BizTalk application as applied to a Bankcard Site. A Bankcard site is a site where banks, merchants and credit card issuers access financial account information including account profile, statements and transactions. Banking, merchant, customer service and card holder user groups can interact with multiple Biztalk icFoundation sites via web, wireless and IVR. The icFoundation sites utilize components and an XML communications layer to interact with the Biztalk engine. The Biztalk engine is mapped to various backend bankcard systems to translate financial data from the icFoundation sites to the backend. The boxes on the far left depict different user groups that can access the icFoundation via web, wireless and IVR. These groups include merchants, customer service, banks and card holders. The boxes on the top right display example icFoundation sites used to interact with the Biztalk enabled web sites. The boxes on the center and bottom right depict the modules of the Biztalk engine used to map and translate data to various backend bankcard systems.

XML enabling of a Legacy system provides an XML gateway and standard set of messages to communicate. These messages may be sent from any platform including Windows, UNIX, mainframe and others. In addition, the icFoundation embedded BizTalk system provides User Account Management and Synchronization between systems. Management of a BizTalk implementation is possible with a large number of partners or message types. The icFoundation system also provides message security for a BizTalk implementation which may require many one-time transactions by many users. icFoundation provides a site where partners may logon and view implementation details about their authorized transaction types. icFoundation also provides a site where partners may logon and view transaction statistics.

BizTalk may be loaded on the icFoundation web server or database server. In order to submit documents via HTTP, the BizTalk Server may need to be running IIS with a special ASP page to receive incoming documents. The icFoundation site may contain an ASP page called icFoundation/BizTalk/ReceiveRequest.asp. This page may accept an XML document as input and submit it to BizTalk. The return value from this page may indicate whether or not the document was successfully submitted. If an acknowledgement is received, it may be sent back at a later time.

BizTalk may be configured using a single channel for each inbound document type. User logon information provided in the icFoundation Login Tag may be used to identify the requestor. The logon information provided may include a method for returning the acknowledge message either through BTS, E-Mail or HTTP. To implement the processing of the request, icFoundation may support both BizTalk AICs and BizTalk Orchestration.

icFoundation may define a set of standard schemas for requesting icFoundation functions via XML. These may include retrieving reports, setting user information and passwords, and the like. Each XML schema may define one type of request and have a specific acknowledgement message.

Configuring a new request may require several steps. First, the administrator may create menus and submenus to represent the request. All BizTalk request menus may refer to the URL:icFoundation/BizTalk/ShowDesc.asp?BizTalkSchema_ID=<%BizTalkSchema_ID%>. This URL may comprise a generic ASP page which may generate a page describing the BizTalk interchange.

The administrator may then assign permissions to these menus to those login groups which may be allowed to submit each type of request via BizTalk. The menus may only appear to these users allowing them to retrieve descriptions and copies of the XML schemas. Next, the request may be registered as a BizTalk schema in the BizTalkSchema table. A new administration screen may be provided for this feature. FIG. 14 is a BizTalkSchema table which may be added to the icFoundation database which may contain all of the interface information necessary for handling XML requests.

The ReqRootTag and AckRootTag may be used to derive the name of the schema file in WebDAV. The path to the schema within WebDAV is "<%WebDAV%>/PCI/<%RootTag%>.xml". The ReqRootTag field may also be used to identify incoming requests. These fields should preferably not include the ".xml" extension. The DescriptionFile name is found in /BizTalk/Descriptions/<%DescriptionFile%>. This field should generally include the file name extension.

icFoundation may define a standard authentication tag called <Login> which may be present in all requests. The following is an example of a login script:

```
<icFReportReq RequestID="XXXYYY001">
    <Login>
        <RequestID>MyReqID001 </RequestID>
        <UserName>Administrator</UserName>
        <Password>1234</Password>
        <SiteURL>http://192.168.100.22</SiteURL>
        <Language >English</Language>
        <channelName>Receive Report Req</ChannelName>
        <AckTransportMethod>BTS</AckTransportMethod>
        <AckTransportAddress>Send Report Ack</AckTransport
            Address>
    </Login>
...
</icFReportReq>.
```

The purpose of the tag is to deliver the information necessary for BizTalk and icFoundation to perform the requested action.

With regard to message security, the first thing to note is the user name and password may be shown in the XML document in an unencrypted form. This may be necessary to identify and authorize the user. Therefore, these messages should generally be passed over untrusted networks in encrypted form. This may be done using SSL via HTTP, other encryption systems inherent in the transport mechanism used or using BizTalk's encryption functionality. The same concerns may exist for the Acknowledgement documents since these may frequently contain proprietary information as well.

With regard to user identification, the information received in the Login Tag may be used to perform a login sequence through icFoundation components. These components may verify the user's password, account status and site assignment. If this process fails, the system may attempt to send the requester a negative acknowledgement.

Once the user is identified by icFoundation, the root tag of the request document may be used to look up the SubMenuID associated with the request messages. Another icFoundation component may be called to verify the user identified is authorized to submit the specific type of BizTalk request. If this process fails, the system may attempt to send the requester a negative acknowledgement.

In some cases, additional authorization checks may be necessary depending on the type of request being made. This final step is specific to the type of request being made and the context of the request as defined by the parameters in the message. For example, BizTalk receives a report generation request. The following steps may occur in order to authorize the request:

1. The user may be identified by icFoundation.
2. The user may be allowed to request reports.
3. The user's profile may be checked to verify they are allowed to view the report requested.

At this point, the request may be honored and fulfilled. If this process fails, the system may attempt to send the requester a negative acknowledgement.

Figure 15:
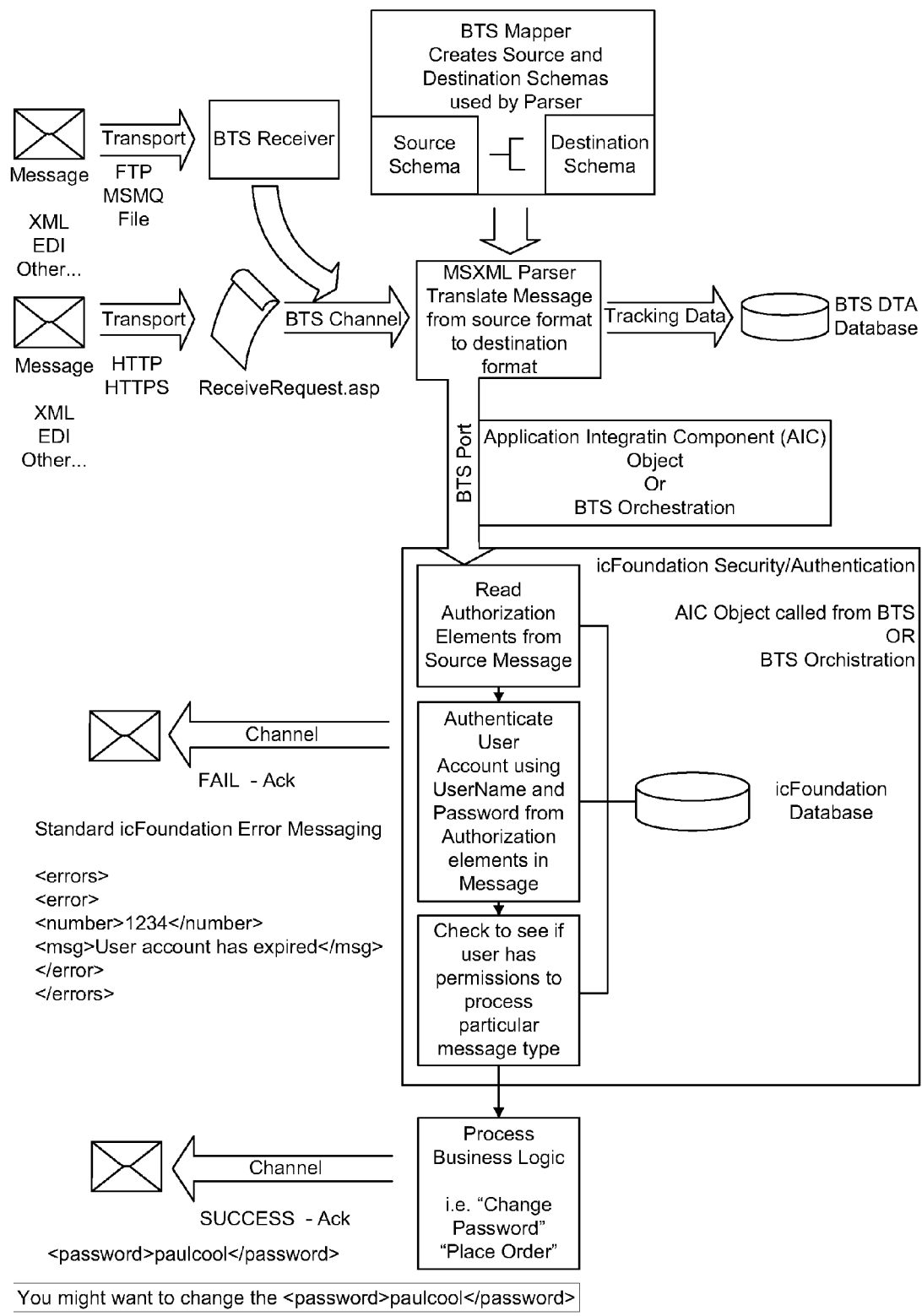
FIG. 15 is a block diagram illustrating Message Authentication/Security.

FIG. 15 is a block diagram illustrating Message Authentication/Security. Biztalk messages in XML, EDI or other formats get transported to the Biztalk server via FTP, MSMQ, File, HTTP or HTTPS. These messages get channeled through the MSXML parser to translate the message from the source format to a destination format. The translated data gets sent through a reconfigured Biztalk port which is made up of an Application Integration Component (AIC) or a Biztalk Orchestration. The port goes through a icFoundation process of reading the authorization elements from the source message, authenticating user account and checking to see if the user has permission to process the particular message type. If the message is authenticated the individual business logic is processed. Message failure and success results are returned to the source through reconfigured Biztalk channels.

The following is a description of Standard icFoundation AIC COM Interfaces. All user related XML COM interfaces may be located in MTXFNLoginXML.DLL. Each interface may have several properties. If these properties are blank, the object may read the properties from the registry. These properties include Options (list of flags to set auditing, db type, and the like) and Connect (database connection string). Each object may include a Language and SiteURL argument as the first two arguments and have strResult and strErrorMsg as the last two arguments:

```
HKEY_LOCAL_MACHINEßoftwarefficFoundationÅIC
    Options String
    /A0.
HKEY_LOCAL_MACHINEßoftwarefficFoundationÅIC
    Connect String
    DSN=icf3_3 UID=MTX_Component; PWD=1234;Database=icf3_
    3;APP=AIC;
```

Each component may contain the standard icFoundation Role based security checks and error routines. A new strOption may be available in icFoundation:
/ERXML=Turn on basic XML based error messaging. The strErrormsg may contain a string containing an XML formatted error message and the strResult may be the string message of the error. The basic error XML may only contain the datetime, number, message and severity of the error
/EEXML=Turn on extended XML based error messaging. The XML may contain all of the error XML The strErrorMsg argument XML may take the following format:

```
<Errors>
    <Error>
        <DateTime>6/12/2000 1:22:22 pm<DateTime>
            <Number>12345</Number>
            <Message>Error occurred authenticating user account.
            </Message>
            <Severity>Error</Severity>
            <TechMessage>Error occurred in code<ITechMessage>
            <Cause>Error in clsAuthUserAuthenticate user. </Cause>
            <Audit>TRUE</Audit>
            <Log>TRUE</Log>
            <NTLOg>FALSE</NTLOg>
            <SupportType>Error Support Type</SupportType>
            <CompileError>13</CompileError>
            <compileErrorDesc>Type Mismatch</Compile ErrorDesc>
            <CompileErrorLine>233</CompileErrorLine>
            <Version>3.2.34</Version>
            <ProgID>MTXFNLoginAIC.AuthenticatUser</ProgID>
        </Error>
</Errors>
```

The icFoundation/BizTalk Authorization Translator will now be described. This function takes a single string argument containing XML with the authentication elements and attributes and translates them to out parameters of the function call. In the functioncall, the Function TranslateAuth (strXML, Byref strLanguage, Byref strSiteURL, Byref strUserName, Byref strPassword, Byref strResult, Byref strErrorMsg, ByRef strRootTag) may be taken as long.

The following return values may be generated:
8 Error occurred in the code. StrResult contains the end user description for the error. StrErrorMsg contains the technical details and properties of the error.
<0 Fail. StrResult contains the reason for failure. StrErrorMsg contains the technical details and properties of the error such as the error number and severity.
−I Failed to translate XML.
−100 Failed security check. User is not in MTS Security Role.
>0 (1) Success.

The function may be implemented as a function of TranslateAuth (strXML, strLanguage, strSiteURL, strUserName, strPassword, [strResult], [strErrorMsg]). FIG. 16 is a table of the function arguments.

The following is a description of the user authentication process. This function takes a username and password and uses these arguments to authenticate if a user may access the site and is active, enabled, not expired and is a member of at least one user group.

The function call for user authentication may take the form of:
Function AuthenticateLogin(strLanguage, strSiteURL, strUserName, strPassword, Byref IngLanguage_ID, Byref Project_ID, Byref IngLogin_ID, Byref str-FullName, Byref strEmail, Optional Byref strResult, Optional Byref strErrorMsg) as long.

Return values for this function call may comprise:
0 Error occurred in the code. strResult contains the end user description for the error. StrErrorMsg contains the technical details and properties of the error.
<0 Fail. StrResult contains the reason for failure. StrErrorMsg contains the technical details and properties of the error such as the error number and severity.
−1 User Account is expired or inactive.
−2 User Account is not found.
−3 No Site Permissions have been setup for the user.
−4 Failed to insert record into LoginLog table.
−5 User is already logged on.
−6 SHA-1 Encryption of password for comparison failed.
−7 User is not a member of any user group or no permissions have been configured for any group(s) the user is a member of.
−100 Failed security check. User is not in MTS Security Role.
>0 (1) Success.

The function implementation for user authentication may comprise:
AuthenticateLogin(strLanguage, strSiteURL, strUserName, strPassword, IngLogin_ID, Project_ID, IngLanguage_ID, strFullName, strEmail, [strResuLt], [strErrorMsg]).

FIG. 17 is a table of the function arguments for user authentication.

The following is a description of the process of checking navigation permissions. This function verifies if the user sending the message has been authenticated during the AuthenticateUser routine and may perform a specific function. This XML Root Tag of the message determines the message type and is mapped to the FNBizTalkSchema.RootTag field, which is associated to a Project_ID, MainID and SubID.

The function call for checking navigation permission may comprise:
Function CheckPermission(IngLanguage_ID, IngProject_ID, IngLogin_ID, strRootTag, Optional Byref strResult, Optional Byref strErrorMsg) as long.

Return values for this function may comprise:
0 Error occurred in the code. strResult contains the end user description for the error. StrErrorMsg contains the technical details and properties of the error.
<0 Fail. StrResult contains the reason for failure. StrErrorMsg contains the technical details and properties of the error such as the error number and severity.
−1 RootTag is not found in FNBizTalkSchema table.
−2 User does NOT have permission to this resource.
−100 Failed security check. User is not in MTS Security Role.
>0 Success. User has permission.
The FUNCTION IMPLEMENTATION.

CheckPermission(IngLanguage_ID, IngProject_ID, IngLogin_ID, strRootTag, [strResult], [strErrorMsg]).

FIG. 18 is a table illustrating the function arguments for checking navigation permission.

The following is a description of the process for checking Report Permissions. This function verifies if the user sending the message has been authenticated during the AuthenticateUser routine and may run a specific report. This XML Root Tag of the message determines the message type and is mapped to the FNBizTalkSchema.RootTag field, which is associated to a Project_ID, MainID and SubID. The actual report is taken from the Report element ReportName attribute. This string value and the associated Project_ID are looked up in the Creport table to determine the Creport_ID and CreportType_ID. These values are used to determine if the user has permissions to the report.

The function call for checking report permissions may comprise:

Function CheckReportPermission (IngLanguage_ID, IngProject_ID, ingLogin_ID, ndReport, Optional Byref strResult, Optional Byref strErrorMsg) as long.

The following is a list of return values for the function call for checking report permissions:

0 Error occurred in the code. strResult contains the end user description for the error. StrErrorMsg contains the technical details and properties of the error.

<0 Fail. StrResult contains the reason for failure. StrErrorMsg contains the technical details and properties of the error such as the error number and severity.

−1 RootTag is not found in FNBizTalkSchema table.

−2 User does NOT have permission to this resource.

−3 Report Name is not found in Creport table.

−4 Report Number is not found in Creport table.

−100 Failed security check. User is not in MTS Security Role.

>0 Success. User has permission.

The function implementation for checking report permission may be as follows:

CheckReportPermission (IngLanguage_ID, IngProject_ID, IngLogin_ID, strRootTag, strReportName, [IngReportNumber], [strResult], [strErrorMsg])

FIG. 19 is a table illustrating the function arguments for checking report permission.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A method of managing a system site for e-commerce comprised of a Web server and a database having stored data, the method comprising:

creating objects via a wizard which function to at least retrieve data from the database;

creating scripts via a wizard which function to at least convert data retrieved by the objects to an HTML stream for real-time transmission to a browser resident on a client computer;

storing only the created objects and the created scripts on the Web server; and when the created scripts are invoked to process the created objects, transmitting the HTML stream to the browser resident of the client computer in real-time without creating and storing on the Web server any actual HTML text files.

2. A computer readable media having stored thereon computer executable instructions for use in managing a system site for e-commerce comprised of a Web server and a database having stored data, the instructions performing steps comprising:

accepting user input via a wizard to create objects which function to at least retrieve data from the database; and accepting user input via a wizard to create scripts which function to at least convert data retrieved by the objects to an HTML stream for real-time transmission to a browser resident on a client computer;

storing only the created objects and the created scripts on the Web server; and when the created scripts are invoked to process the created objects, transmitting the HTML stream to the browser resident on the client computer in real-time without creating and storing on the Web server any actual HTML text files.

* * * * *